US012659909B2

(12) United States Patent
Manolakos et al.

(10) Patent No.: US 12,659,909 B2
(45) Date of Patent: Jun. 16, 2026

(54) BATCH POSITIONING REPORTING

(71) Applicant: QUALCOMM INCORPORATED,
San Diego, CA (US)

(72) Inventors: Alexandros Manolakos, Escondido,
CA (US); Mukesh Kumar, Hyderabad
(IN); Srinivas Yerramalli, San Diego,
CA (US); Sony Akkarakaran, Poway,
CA (US); Guttorm Ringstad Opshaug,
Redwood City, CA (US)

(73) Assignee: QUALCOMM Incorporated, San
Diego, CA (US)

( * ) Notice: Subject to any disclaimer, the term of this
patent is extended or adjusted under 35
U.S.C. 154(b) by 335 days.

(21) Appl. No.: 18/275,758

(22) PCT Filed: Feb. 7, 2022

(86) PCT No.: PCT/US2022/015511
§ 371 (c)(1),
(2) Date: Aug. 3, 2023

(87) PCT Pub. No.: WO2022/211903
PCT Pub. Date: Oct. 6, 2022

(65) Prior Publication Data
US 2024/0107488 A1 Mar. 28, 2024

(30) Foreign Application Priority Data
Mar. 30, 2021 (GR) .............................. 20210100211

(51) Int. Cl.
*H04W 64/00* (2009.01)
*H04L 5/00* (2006.01)

(52) U.S. Cl.
CPC ........... *H04W 64/00* (2013.01); *H04L 5/0051*
(2013.01)

(58) Field of Classification Search
CPC ....... H04W 64/00; H04W 8/24; H04W 24/08;
H04W 24/10; H04L 5/0048; H04L 5/0051
See application file for complete search history.

(56) References Cited

U.S. PATENT DOCUMENTS

| | | | | |
|---|---|---|---|---|
| 2020/0137607 A1* | 4/2020 | Akkarakaran | ........ | G01S 5/0215 |
| 2023/0292273 A1* | 9/2023 | Zhang | ............... | H04W 56/0045 |
| 2023/0337175 A1* | 10/2023 | Shi | ......................... | H04W 64/00 |

(Continued)

OTHER PUBLICATIONS

Huawei, et al., "Corrections on the Positioning Measurement Report
in 37.355", 3GPP TSG-RAN WG2 Meeting # 110-e, R2-2005101,
3rd Generation Partnership Project, Mobile Competence Centre,
650, Route Des Lucioles, F-06921 Sophia-Antipolis Cedex, France,
vol. RAN WG2, No. Electronic, Jun. 1, 2020-Jun. 12, 2020, May
22, 2020, XP051888585, 9 Pages.

(Continued)

*Primary Examiner* — Siu M Lee
(74) *Attorney, Agent, or Firm* — QUALCOMM
Incorporated

(57) ABSTRACT

A method of reporting positioning measurement reporting
capability includes: establishing a positioning session
between a telecommunication device and a network entity;
and transmitting, from the telecommunication device to the
network entity, a capability report indicating a measurement
reporting capacity for a batch measurement report of mea-
surements of a plurality of PRS instances.

44 Claims, 13 Drawing Sheets

1200

(56) References Cited

U.S. PATENT DOCUMENTS

| | | | | |
|---|---|---|---|---|
| 2023/0344570 | A1 * | 10/2023 | Jung ..................... | H04L 5/0055 |
| 2023/0370221 | A1 * | 11/2023 | Schaepperle ......... | H04L 5/0048 |
| 2023/0375655 | A1 * | 11/2023 | Harrebek ............. | H04B 7/0617 |
| 2024/0040542 | A1 * | 2/2024 | Barbu ................... | H04W 76/40 |
| 2024/0064687 | A1 * | 2/2024 | Ren ..................... | H04B 17/328 |

OTHER PUBLICATIONS

International Search Report and Written Opinion—PCT/US2022/015511—ISA/EPO—May 20, 2022.
Qualcomm Incorporated: "On PRS-RSRP Measurements for NR Positioning", 3GPP TSG-RAN WG4 Meeting #94-e, R4-2000732, 3rd Generation Partnership Project, Mobile Competence Centre, 650, Route Des Lucioles, F-06921 Sophia-Antipolis Cedex, France, vol. RAN WG4, No. Online, Feb. 24, 2020-Mar. 6, 2020, Feb. 14, 2020, XP051850703, 9 Pages.
Qualcomm Incorporated: "On PRS-RSTD Measurements for NR Positioning", 3GPP TSG-RAN WG4 Meeting #94-e, 3GPP Draft, R4-2000731, 3rd Generation Partnership Project, Mobile Competence Centre, 650, Route Des Lucioles, F-06921 Sophia-Antipolis Cedex, France, vol. RAN WG4, No. Online, Feb. 24, 2020-Mar. 6, 2020, Feb. 14, 2020, XP051850702, 12 Pages.

* cited by examiner

1200
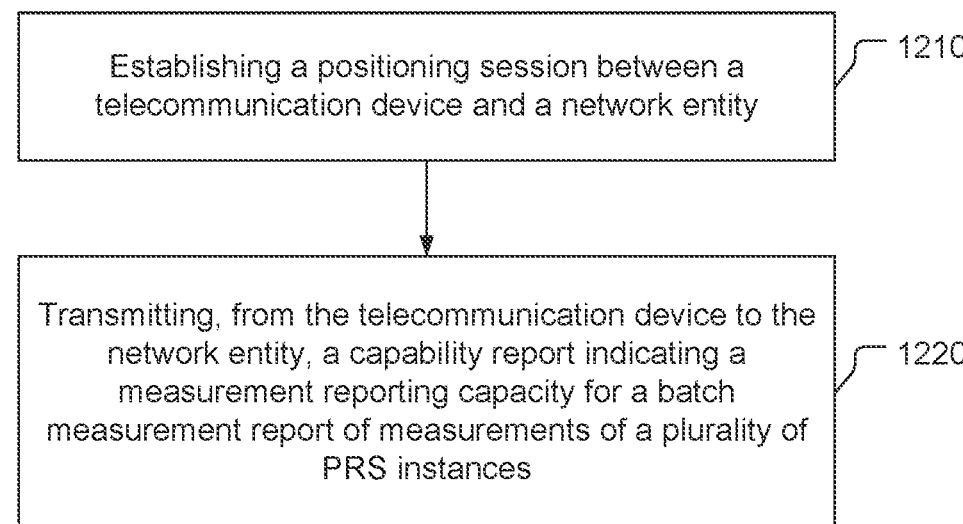
Establishing a positioning session between a
telecommunication device and a network entity    1210
Transmitting, from the telecommunication device to the
network entity, a capability report indicating a
measurement reporting capacity for a batch
measurement report of measurements of a plurality of
PRS instances    1220
FIG. 12

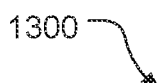

Receiving, at a telecommunication device, a schedule of a plurality of scheduled PRS resources (positioning reference signal resources) corresponding to a plurality of PRS instances and corresponding to a time span, the plurality of scheduled PRS resources comprising a first plurality of PRS resources and a second plurality of PRS resources that is separate from the first plurality of PRS resources ⟋⎯ 1310

Transmitting, from the telecommunication device to a network entity, a batch measurement report corresponding to the time span and comprising a plurality of PRS resource measurements each corresponding to a respective PRS resource of the second plurality of PRS resources ⟋⎯ 1320

Providing consistent reporting across a plurality of measurement sub-reports of the batch measurement report by ensuring that at least two of the plurality of PRS resource measurements correspond to a same PRS level and that each of the at least two of the plurality of PRS resource measurements corresponds to a respective different one of the plurality of PRS instances ⟋⎯ 1330

Figure 14:
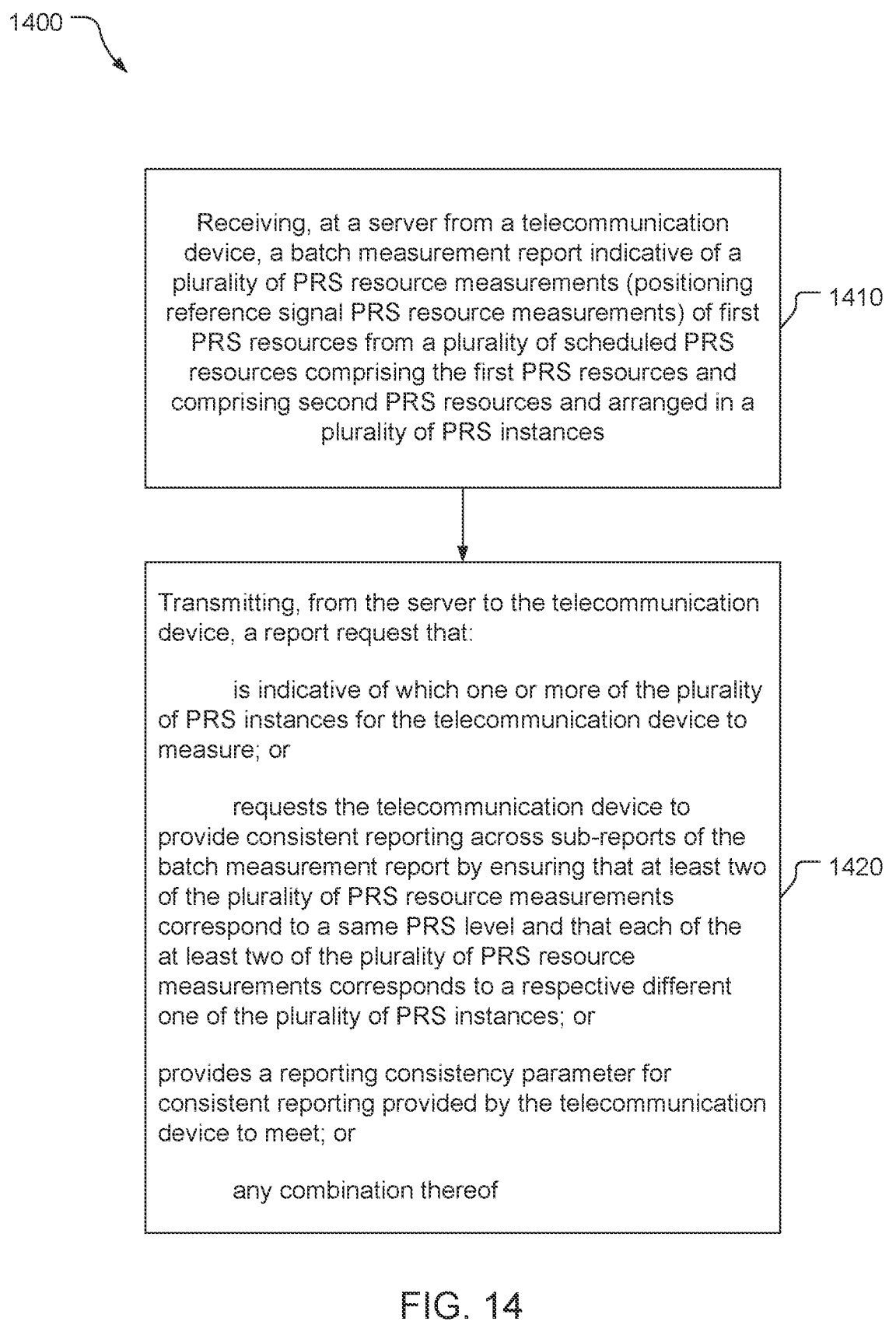

Receiving, at a server from a telecommunication device, a batch measurement report indicative of a plurality of PRS resource measurements (positioning reference signal PRS resource measurements) of first PRS resources from a plurality of scheduled PRS resources comprising the first PRS resources and comprising second PRS resources and arranged in a plurality of PRS instances

1410

Transmitting, from the server to the telecommunication device, a report request that:

is indicative of which one or more of the plurality of PRS instances for the telecommunication device to measure; or requests the telecommunication device to provide consistent reporting across sub-reports of the batch measurement report by ensuring that at least two of the plurality of PRS resource measurements correspond to a same PRS level and that each of the at least two of the plurality of PRS resource measurements corresponds to a respective different one of the plurality of PRS instances; or provides a reporting consistency parameter for consistent reporting provided by the telecommunication device to meet; or any combination thereof

| Frequency range | Max sub-reports (instances) per batch report | Max measurement elements per batch report |
|---|---|---|
| FR1 | Max1 | Max4 |
| | Max2 | Max5 |
| FR2 | Max3 | Max6 |

1550

| Band | Max sub-reports (instances) per batch report | Max measurement elements per batch report |
|---|---|---|
| B1 | Max1 | Max4 |
| B2 | Max2 | Max5 |
| B3 | Max3 | Max6 |

BATCH POSITIONING REPORTING

CROSS-REFERENCE TO RELATED APPLICATIONS

This application is the National Stage of International Application No. PCT/US2022/015511, filed Feb. 7, 2022, entitled "BATCH POSITIONING REPORTING," which claims the benefit of Greek patent application No. 20210100211, filed Mar. 30, 2021, entitled "BATCH POSITIONING REPORTING," both of which are assigned to the assignee hereof, and the entire contents of both of which are hereby incorporated herein by reference for all purposes.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

An example telecommunication device includes: a transceiver; a memory; and a processor, communicatively coupled to the transceiver and the memory, configured to: establish a positioning session with a network entity; and transmit, via the transceiver to the network entity, a capability report indicating a measurement reporting capacity for a batch measurement report of measurements of a plurality of PRS instances (positioning reference signal instances).

Implementations of such a telecommunication device may include one or more of the following features. The measurement reporting capacity includes a quantity of measurement sub-reports each corresponding to a respective one of the plurality of PRS instances. The measurement reporting capacity includes a quantity of measurement elements each corresponding to a respective one of the plurality of PRS instances and to a PRS source. The capability report indicates that the telecommunication device is capable of ensuring that the measurements of the plurality of PRS instances include PRS resource measurements of consistent PRS level. The capability report indicates the measurement reporting capacity as a function of a frequency of PRS resources of the plurality of PRS instances. The capability report indicates a processing priority of the plurality of PRS instances.

An example method of reporting positioning measurement reporting capability includes: establishing a positioning session between a telecommunication device and a network entity; and transmitting, from the telecommunication device to the network entity, a capability report indicating a measurement reporting capacity for a batch measurement report of measurements of a plurality of PRS instances.

Implementations of such a method may include one or more of the following features. The measurement reporting capacity includes a quantity of measurement sub-reports each corresponding to a respective one of the plurality of PRS instances. The measurement reporting capacity includes a quantity of measurement elements each corresponding to a respective one of the plurality of PRS instances and to a PRS source. The capability report indicates that the telecommunication device is capable of ensuring that the measurements of the plurality of PRS instances include PRS resource measurements of consistent PRS level. The capability report indicates the measurement reporting capacity as a function of a frequency of PRS resources of the plurality of PRS instances. The capability report indicates a processing priority of the plurality of PRS instances.

Another example telecommunication device includes: means for establishing a positioning session with a network entity; and means for transmitting, to the network entity, a capability report indicating a measurement reporting capacity for a batch measurement report of measurements of a plurality of PRS instances.

Implementations of such a telecommunication device may include one or more of the following features. The measurement reporting capacity includes a quantity of measurement sub-reports each corresponding to a respective one of the plurality of PRS instances. The measurement reporting capacity includes a quantity of measurement elements each corresponding to a respective one of the plurality of PRS instances and to a PRS source. The capability report indicates that the telecommunication device is capable of ensuring that the measurements of the plurality of PRS instances include PRS resource measurements of consistent PRS level. The capability report indicates the measurement reporting capacity as a function of a frequency of PRS resources of the plurality of PRS instances. The capability report indicates a processing priority of the plurality of PRS instances.

An example non-transitory, processor-readable storage medium includes processor-readable instructions to cause a processor of a telecommunication device to: establish a positioning session with a network entity; and transmit, to the network entity, a capability report indicating a measurement reporting capacity for a batch measurement report of measurements of a plurality of PRS instances.

Implementations of such a storage medium may include one or more of the following features. The measurement reporting capacity includes a quantity of measurement sub-reports each corresponding to a respective one of the plurality of PRS instances. The measurement reporting capacity includes a quantity of measurement elements each corresponding to a respective one of the plurality of PRS instances and to a PRS source. The capability report indicates that the telecommunication device is capable of ensuring that the measurements of the plurality of PRS instances include PRS resource measurements of consistent PRS level. The capability report indicates the measurement reporting capacity as a function of a frequency of PRS resources of the plurality of PRS instances. The capability report indicates a processing priority of the plurality of PRS instances.

An example server includes: a transceiver; a memory; and a processor, communicatively coupled to the transceiver and the memory, configured to: receive, from a telecommunication device via the transceiver, a batch measurement report indicative of a plurality of PRS resource measurements of first PRS resources from a plurality of scheduled PRS resources including the first PRS resources and including second PRS resources and arranged in a plurality of PRS instances; and transmit, to the telecommunication device via the transceiver, a report request that: is indicative of which one or more of the plurality of PRS instances for the telecommunication device to measure; or requests the telecommunication device to provide consistent reporting across sub-reports of the batch measurement report by ensuring that at least two of the plurality of PRS resource measurements correspond to a same PRS level and that each of the at least two of the plurality of PRS resource measurements corresponds to a respective different one of the plurality of PRS instances; or provides a reporting consistency parameter for consistent reporting provided by the telecommunication device to meet; or any combination thereof.

Implementations of such a server may include one or more of the following features. The report request indicates a particular instance of the plurality of PRS instances for the telecommunication device to measure. The report request indicates a window of time corresponding to a subset of the plurality of PRS instances for the telecommunication device to measure. The report request provides the reporting consistency parameter, and the reporting consistency parameter includes an indication of a PRS source, an indication of a PRS resource set, or an indication of a particular PRS resource of the plurality of scheduled PRS resources, or any combination thereof. The report request provides the reporting consistency parameter, and the reporting consistency parameter includes a first quantity of PRS items for which to provide consistent reporting, or a second quantity of the plurality of PRS instances from which to use PRS reference measurements to determine a particular PRS item for which to provide consistent reporting, or a combination thereof.

An example method for affecting positioning reference signal reporting includes: receiving, at a server from a telecommunication device, a batch measurement report indicative of a plurality of PRS resource measurements of first PRS resources from a plurality of scheduled PRS resources including the first PRS resources and including second PRS resources and arranged in a plurality of PRS instances; and transmitting, from the server to the telecommunication device, a report request that: is indicative of which one or more of the plurality of PRS instances for the telecommunication device to measure; or requests the telecommunication device to provide consistent reporting across sub-reports of the batch measurement report by ensuring that at least two of the plurality of PRS resource measurements correspond to a same PRS level and that each of the at least two of the plurality of PRS resource measurements corresponds to a respective different one of the plurality of PRS instances; or provides a reporting consistency parameter for consistent reporting provided by the telecommunication device to meet; or any combination thereof.

Implementations of such a method may include one or more of the following features. The report request indicates a particular instance of the plurality of PRS instances for the telecommunication device to measure. The report request indicates a window of time corresponding to a subset of the plurality of PRS instances for the telecommunication device to measure. The report request provides the reporting consistency parameter, and the reporting consistency parameter includes an indication of a PRS source, an indication of a PRS resource set, or an indication of a particular PRS resource of the plurality of scheduled PRS resources, or any combination thereof. The report request provides the reporting consistency parameter, and the reporting consistency parameter includes a first quantity of PRS items for which to provide consistent reporting, or a second quantity of the plurality of PRS instances from which to use PRS reference measurements to determine a particular PRS item for which to provide consistent reporting, or a combination thereof.

Another example server includes: means for receiving, from a telecommunication device, a batch measurement report indicative of a plurality of PRS resource measurements of first PRS resources from a plurality of scheduled PRS resources including the first PRS resources and including second PRS resources and arranged in a plurality of PRS instances; and means for transmitting, to the telecommunication device, a report request that: is indicative of which one or more of the plurality of PRS instances for the telecommunication device to measure; or requests the telecommunication device to provide consistent reporting across sub-reports of the batch measurement report by ensuring that at least two of the plurality of PRS resource measurements correspond to a same PRS level and that each of the at least two of the plurality of PRS resource measurements corresponds to a respective different one of the plurality of PRS instances; or provides a reporting consistency parameter for consistent reporting provided by the telecommunication device to meet; or any combination thereof.

Implementations of such a server may include one or more of the following features. The report request indicates a particular instance of the plurality of PRS instances for the telecommunication device to measure. The report request indicates a window of time corresponding to a subset of the plurality of PRS instances for the telecommunication device to measure. The report request provides the reporting consistency parameter, and the reporting consistency parameter includes an indication of a PRS source, an indication of a PRS resource set, or an indication of a particular PRS resource of the plurality of scheduled PRS resources, or any combination thereof. The report request provides the reporting consistency parameter, and the reporting consistency parameter includes a first quantity of PRS items for which to provide consistent reporting, or a second quantity of the plurality of PRS instances from which to use PRS reference measurements to determine a particular PRS item for which to provide consistent reporting, or a combination thereof.

Another example non-transitory, processor-readable storage medium includes processor-readable instructions to cause a processor of a server to: receive, from a telecommunication device, a batch measurement report indicative of a plurality of PRS resource measurements of first PRS resources from a plurality of scheduled PRS resources including the first PRS resources and including second PRS resources and arranged in a plurality of PRS instances; and transmit, to the telecommunication device, a report request that: is indicative of which one or more of the plurality of PRS instances for the telecommunication device to measure; or requests the telecommunication device to provide consistent reporting across sub-reports of the batch measurement report by ensuring that at least two of the plurality of PRS resource measurements correspond to a same PRS level and that each of the at least two of the plurality of PRS resource measurements corresponds to a respective different one of the plurality of PRS instances; or provides a reporting consistency parameter for consistent reporting provided by the telecommunication device to meet; or any combination thereof.

Implementations of such a storage medium may include one or more of the following features. The report request indicates a particular instance of the plurality of PRS instances for the telecommunication device to measure. The report request indicates a window of time corresponding to a subset of the plurality of PRS instances for the telecommunication device to measure. The report request provides the reporting consistency parameter, and the reporting consistency parameter includes an indication of a PRS source, an indication of a PRS resource set, or an indication of a particular PRS resource of the plurality of scheduled PRS resources, or any combination thereof. The report request provides the reporting consistency parameter, and the reporting consistency parameter includes a first quantity of PRS items for which to provide consistent reporting, or a second quantity of the plurality of PRS instances from which to use PRS reference measurements to determine a particular PRS item for which to provide consistent reporting, or a combination thereof.

Another example telecommunication device includes: a transceiver; a memory; and a processor, communicatively coupled to the transceiver and the memory, configured to: receive a schedule of a plurality of scheduled PRS resources corresponding to a plurality of PRS instances and corresponding to a time span, the plurality of scheduled PRS resources including a first plurality of PRS resources and a second plurality of PRS resources that is separate from the first plurality of PRS resources; transmit, via the transceiver to a network entity, a batch measurement report corresponding to the time span and including a plurality of PRS resource measurements each corresponding to a respective PRS resource of the second plurality of PRS resources; and provide consistent reporting across a plurality of measurement sub-reports of the batch measurement report by ensuring that at least two of the plurality of PRS resource measurements correspond to a same PRS level and that each of the at least two of the plurality of PRS resource measurements corresponds to a respective different one of the plurality of PRS instances.

BRIEF DESCRIPTION OF THE DRAWINGS

FIG. 12 is a block flow diagram of a method of reporting positioning measurement reporting capability.

FIG. 13 is a block flow diagram of a positioning measurement reporting method.

FIG. 14 is a block flow diagram of a method for affecting positioning reference signal reporting.

DETAILED DESCRIPTION

Figure 1:
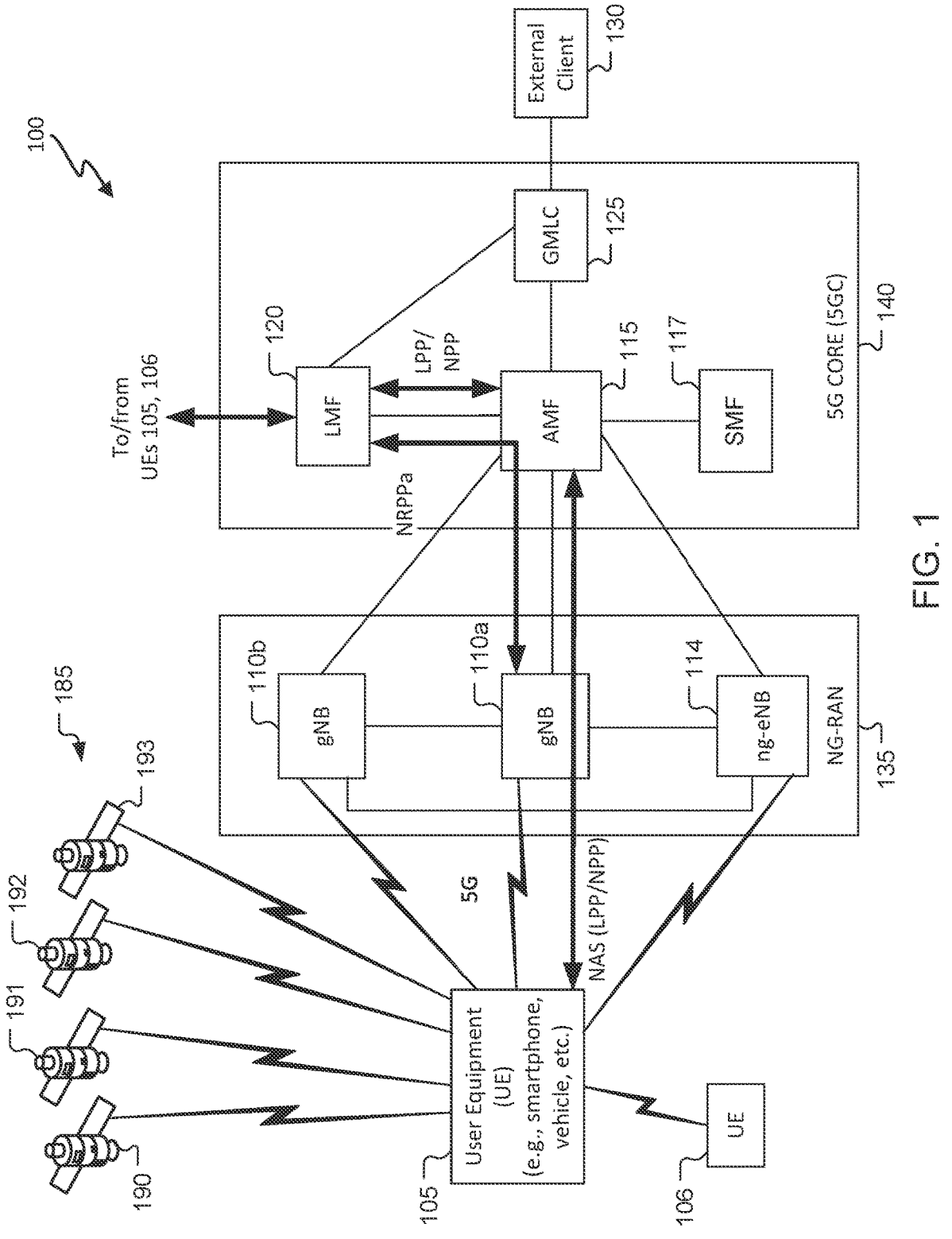
FIG. 1 is a simplified diagram of an example wireless communications system.

Techniques are discussed herein for measuring PRS (positioning reference signal(s)), batch reporting PRS measurements, and requesting reporting of PRS measurements in batch reports. PRS may be provided over a window of time with multiple instances of the PRS provided during the window. A UE (user equipment) or base station may measure PRS resources and report measurements corresponding to multiple instances in a batch report. The UE or base station may report to a network entity a capacity for measurement reports for the window of time, e.g., in terms of number of instances for which measurements may be provided and/or total measurements that may be provided for any number of the instances. The UE or base station may determine which PRS resources to report based on measurements by the UE or base station and/or based on reporting requested by a network entity such as a server (e.g., a Location Management Function (LMF)). Which PRS resources are reported to the server may vary from instance to instance of the PRS. Some PRS measurement reporting may be consistent over multiple instances, e.g., with measurements of the same PRS resource in multiple instances being reported, with measurements of PRS resources within the same PRS resource set in multiple instances being reported, and/or with measurements of PRS resources from the same PRS source (e.g., base station or UE) in multiple instances being reported. For time-difference-of-arrival measurements, each sub-report (corresponding to a respective instance) of a batch report may have a separate reference PRS resource (with a corresponding PRS reference identifier). Each sub-report may include a separate error report. These are examples, and other examples may be implemented.

Items and/or techniques described herein may provide one or more of the following capabilities, as well as other capabilities not mentioned. Positioning accuracy and/or latency may be improved, e.g., by obtaining desired PRS measurements. Energy may be conserved scheduling PRS and/or requesting PRS measurement reporting based on UE capability(ies). Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE (Institute of Electrical and Electronics Engineers) 802.11, etc.) and so on.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB).

In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN) 135, here a Fifth Generation (5G) Next Generation (NG) RAN (NG-RAN), and a 5G Core Network (5GC) 140. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the $3^{rd}$ Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110*a*, 110*b*, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110*a*, 110*b* and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110*a*, 110*b*, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110*a*, 110*b*, and/or the ng-eNB 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more of the base stations, e.g., one or more of the gNBs 110*a*, 110*b*, and/or the ng-eNB 114 may be configured to communicate with the UE 105 via multiple carriers. Each of the gNBs 110*a*, 110*b*, and/or the ng-eNB 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although only one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110*a*, 110*b*, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110*a*, 110*b*, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110*a*, 110*b* are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the gNBs 110*a*, 110*b*, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110*a*, 110*b*, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11 p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, asset tracker, health monitors, security systems, smart city sensors, smart meters, wearable trackers, or some other portable or moveable device. Typically, though not necessarily, the UE 105 may support wireless communication using one or more radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UE 105 via wireless communication between the UE 105 and one or more of the gNBs 110*a*, 110*b*, which may provide wireless communications access to the 5GC 140 on behalf of the UE 105 using 5G. In FIG. 1, the serving gNB for the UE 105 is assumed to be the gNB 110*a*, although another gNB (e.g. the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The gNBs 110*a*, 110*b*, and/or the ng-eNB 114 may each comprise one or more TRPs. For example, each sector within a cell of a BS may comprise a TRP, although multiple TRPs may share one or more components (e.g., share a processor but have separate antennas). The system 100 may include only macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110a, 110b, and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/ system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though only one of these connections may be supported by the 5GC 140 in some implementations.

As further illustrated in FIG. 1, the LMF 120 may communicate with the gNBs 110a, 110b and/or the ng-eNB

114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS (Synchronization Signals) or PRS transmissions from the gNBs 110a, 110b, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS or PRS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS or PRS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS or PRS beams from a plurality of base stations (such as the gNBs 110a, 110b, the ng-eNB 114, etc.) to compute the UE's position.

Figure 2:
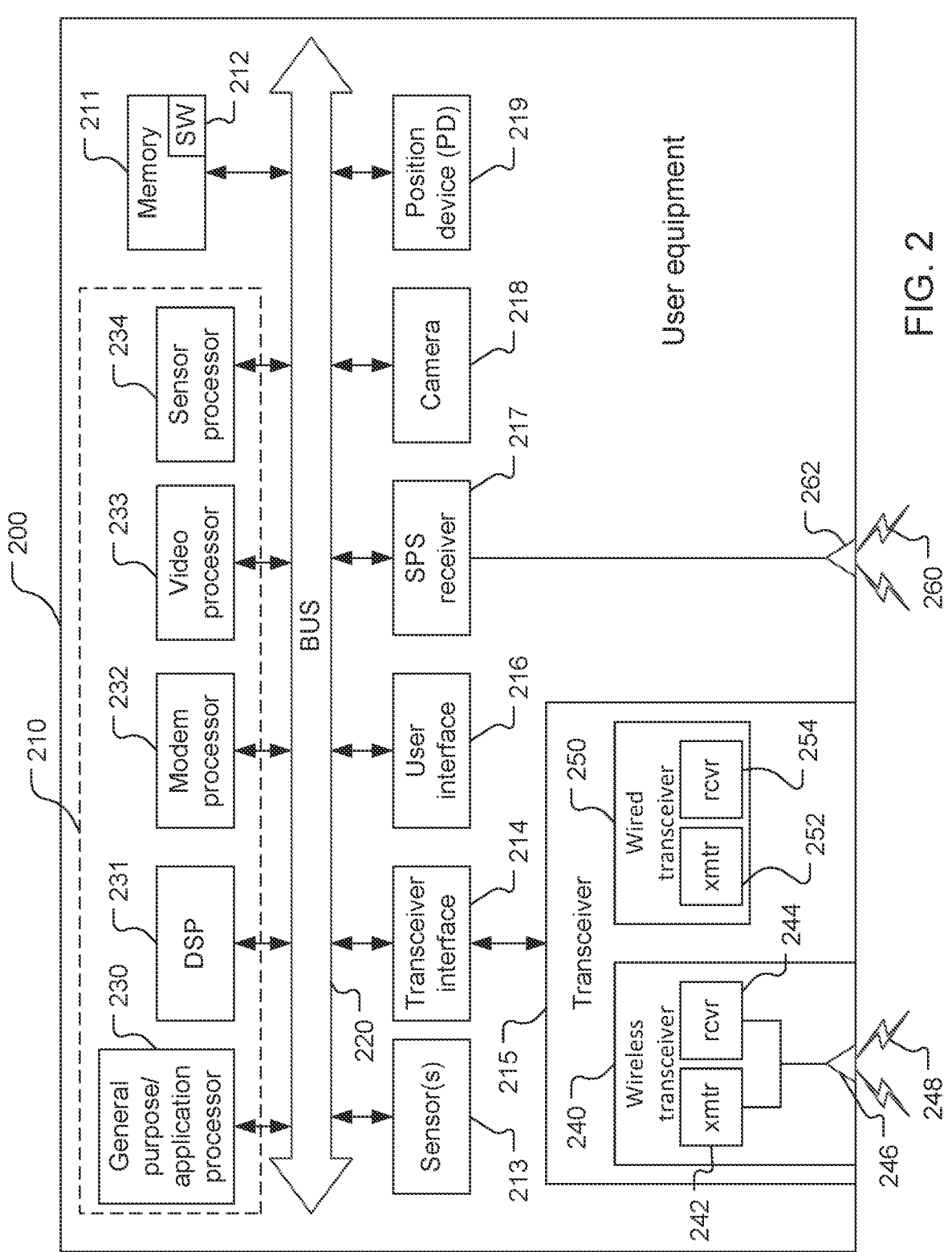
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and/or a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose/application processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose/application processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. Alternatively, the magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. The wireless transmitter 242 includes appropriate components (e.g., a power amplifier and a digital-to-analog converter). The wireless receiver 244 includes appropriate components (e.g., one or more amplifiers, one or more frequency filters, and an analog-to-digital converter). The wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose/application processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio 110 device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 from wireless signals to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose/application processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose/application processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS (Complementary Metal-Oxide Semiconductor) imager), a lens, analog-to-digital circuitry, frame buffers, etc. Additional processing, conditioning, encoding, and/or compression of signals representing captured images may be performed by the general-purpose/application processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the wireless signals 248) for trilateration, for assistance with obtaining and using the SPS signals 260, or both. The PD 219 may be configured to determine location of the UE 200 based on a cell of a serving base station (e.g., a cell center) and/or another technique such as E-CID. The PD 219 may be configured to use one or more images from the camera 218 and image recognition combined with known locations of landmarks (e.g., natural landmarks such as mountains and/or artificial landmarks such as buildings, bridges, streets, etc.) to determine location of the UE 200. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose/application processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general-purpose/application processor 230, the transceiver 215, the SPS receiver 217, and/or another component of the UE 200, and may be provided by hardware, software, firmware, or various combinations thereof.

Figure 3:
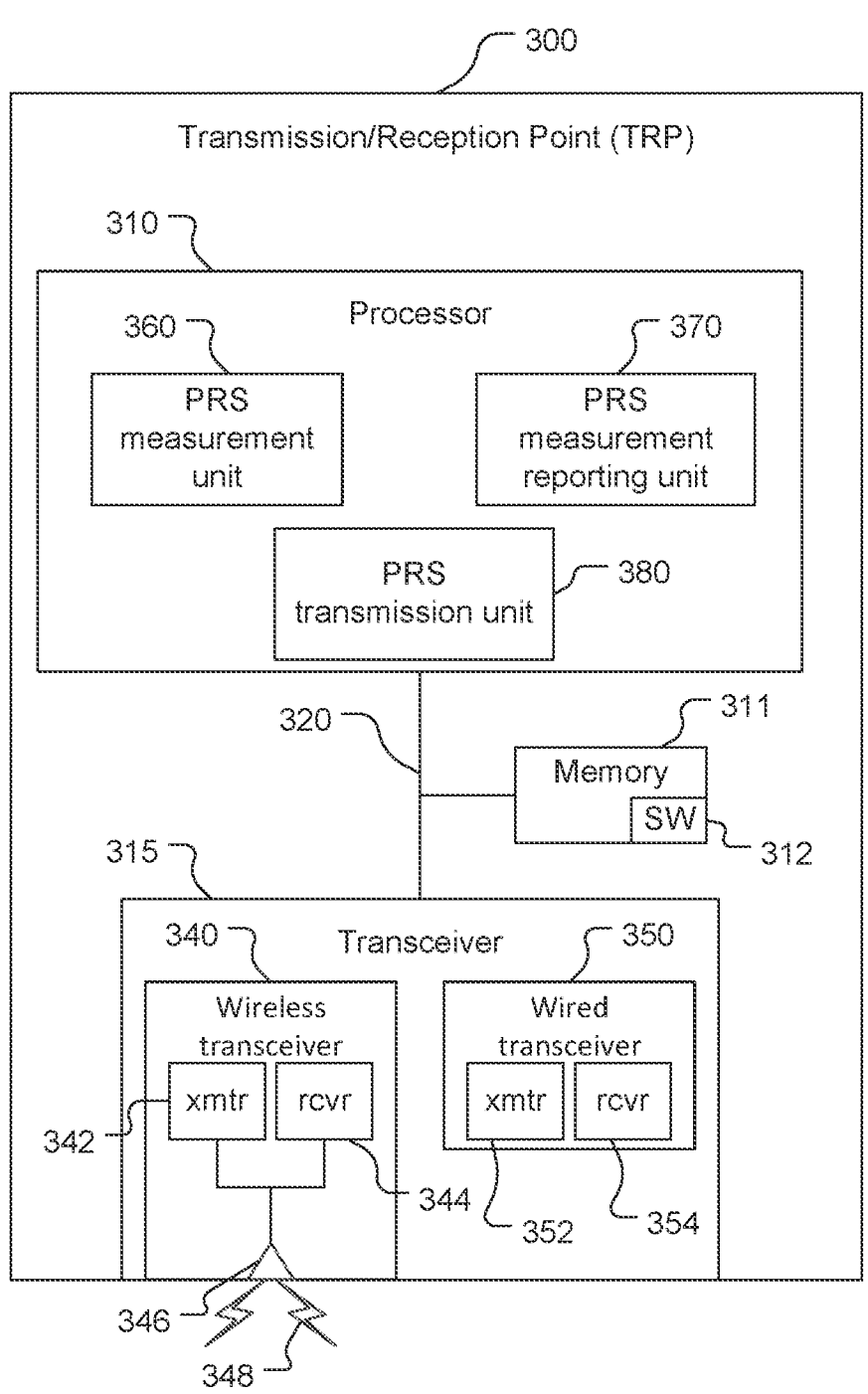
FIG. 3 is a block diagram of components of an example transmission/reception point.

Referring also to FIG. 3, an example of a TRP 300 of the gNBs 110a, 110b, and/or the ng-eNB 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless transceiver) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the gNBs 110*a*, 110*b*, and/or the ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the NG-RAN 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
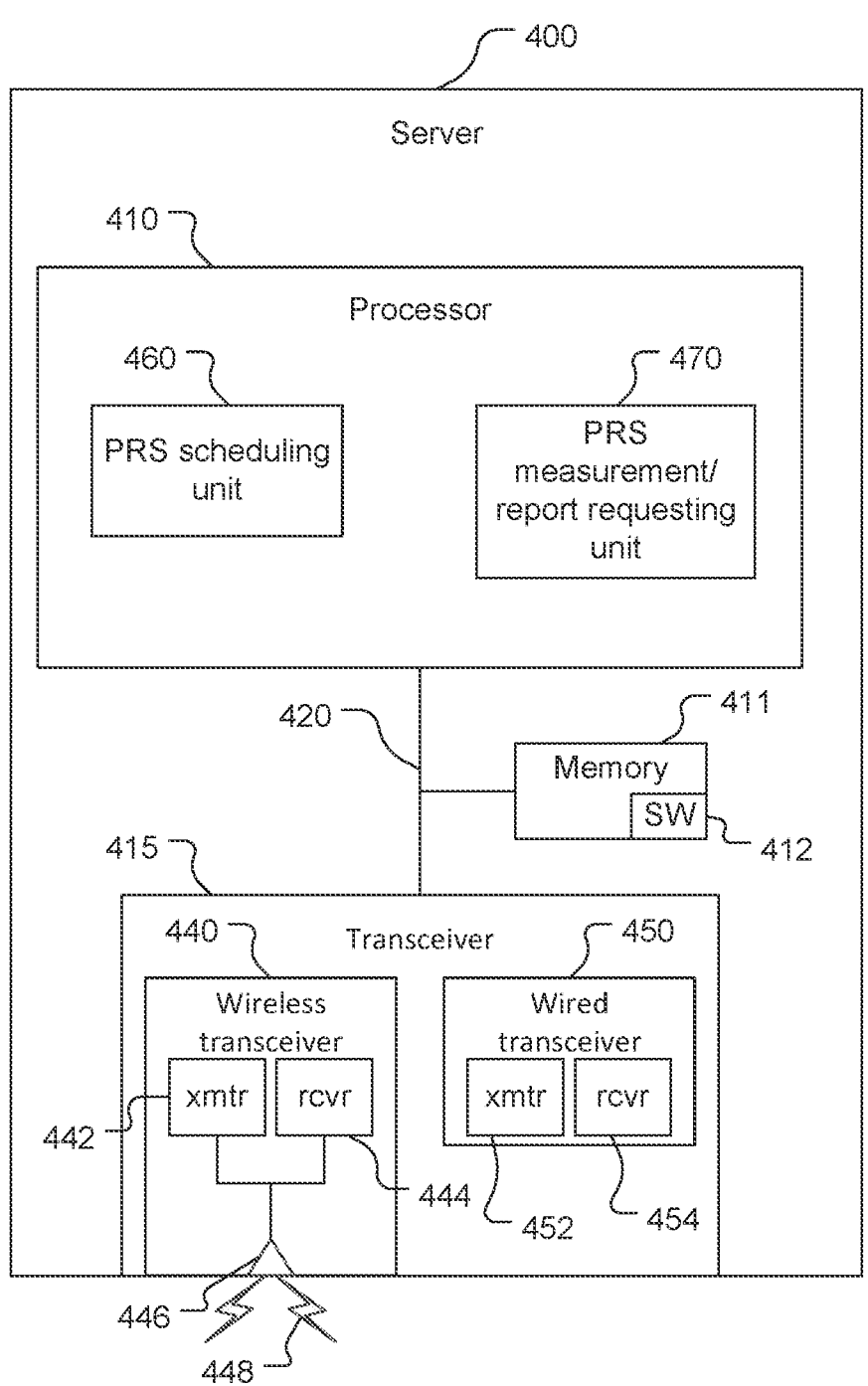
FIG. 4 is a block diagram of components of an example server, various embodiments of which are shown in FIG. 1.

Referring also to FIG. 4, a server 400, of which the LMF 120 is an example, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless transceiver) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the NG-RAN 135 to send communications to, and receive communications from, the TRP 300, for example, and/or one or more other entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Positioning Techniques

For terrestrial positioning of a UE in cellular networks, techniques such as Advanced Forward Link Trilateration (AFLT) and Observed Time Difference Of Arrival (OT-DOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that only the UEs subscribed to the service can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or wardriving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx \rightarrow Tx}$ (i.e., UE $T_{Rx\text{-}Tx}$ or $UE_{Rx\text{-}Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx\text{-}Rx}$ between the transmission time of the RTT measurement signal from the base station and the ToA of the RTT response at the base station to the UE-reported time difference $T_{Rx \rightarrow Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight-line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS, CSI-RS (Channel State Information-Reference Signal)), may refer to one reference signal or more than one reference signal.

Positioning reference signals (PRS) include downlink PRS (DL PRS, often referred to simply as PRS) and uplink PRS (UL PRS) (which may be called SRS (Sounding Reference Signal) for positioning). A PRS may comprise a PN code (pseudorandom number code) or be generated using a PN code (e.g., by modulating a carrier signal with the PN code) such that a source of the PRS may serve as a pseudo-satellite (a pseudolite). The PN code may be unique to the PRS source (at least within a specified area such that identical PRS from different PRS sources do not overlap). PRS may comprise PRS resources and/or PRS resource sets of a frequency layer. A DL PRS positioning frequency layer (or simply a frequency layer) is a collection of DL PRS resource sets, from one or more TRPs, with PRS resource(s) that have common parameters configured by higher-layer parameters DL-PRS-PositioningFrequencyLayer, DL-PRS-ResourceSet, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Common resource blocks are the set of resource blocks that occupy a channel bandwidth. A bandwidth part (BWP) is a set of contiguous common resource blocks and may include all the common resource blocks within a channel bandwidth or a subset of the common resource blocks. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource element is a PRS resource element). A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource, or simply resource can also be referred to as a beam. This does not have any implications on whether the base stations and the beams on which PRS are transmitted are known to the UE.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple OFDM (Orthogonal Frequency Division Multiplexing) Resource Elements (REs) that may be in multiple Resource Blocks (RBs) within N (one or more) consecutive symbol(s) within a slot. PRS resources (or reference signal (RS) resources generally) may be referred to as OFDM PRS resources (or OFDM RS resources). An RB is a collection of REs spanning a quantity of one or more consecutive symbols in the time domain and a quantity (12 for a 5G RB) of consecutive sub-carriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell.

The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Stitching comprises combining PRS measurements over individual bandwidth fragments such that the stitched PRS may be treated as having been taken from a single measurement. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (Base Transceiver Station) (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning being sent by UEs, and with PRS and SRS for positioning being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

PRS Batch Measurement Reporting

Referring again to FIG. 3, with further reference to FIGS. 1 and 2, the description herein may refer to the processor 310 performing a function, but this includes other implementations such as where the processor 310 executes software (stored in the memory 311) and/or firmware. The description herein may refer to the TRP 300 performing a function as shorthand for one or more appropriate components (e.g., the processor 310 and the memory 311) of the TRP 300 performing the function. The processor 310 (possibly in conjunction with the memory 311 and, as appropriate, the transceiver 315) may include a PRS measurement unit 360, a PRS measurement reporting unit 370, and a PRS transmission unit 380. The PRS measurement unit 360, the PRS measurement reporting unit 370, and the PRS transmission unit 380 are discussed further below, and the description may refer to the processor 310 generally, or the TRP 300 generally, as performing any of the functions of the PRS measurement unit 360, the PRS measurement reporting unit 370, or the PRS transmission unit 380, with the TRP 300 being configured to perform the functions.

Referring also to FIG. 4 again, the description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function. The processor 410 (possibly in conjunction with the memory 411 and, as appropriate, the transceiver 415) may include a PRS scheduling unit 460 and a PRS measurement/report requesting unit 470. The PRS scheduling unit 460 and the PRS measurement/report requesting unit 470 are discussed further below, and the description may refer to the processor 410 generally, or the server 400 generally, as performing any of the functions of the PRS scheduling unit 460 or the PRS measurement/report requesting unit 470, with the server 400 being configured to perform the functions.

Figure 5:
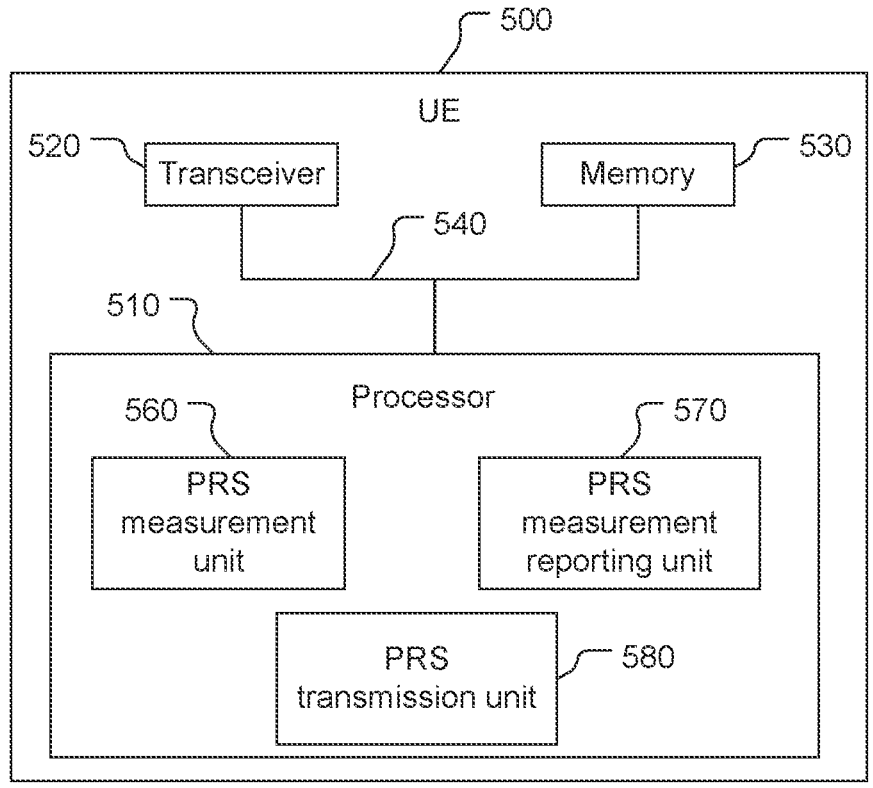
FIG. 5 is a block diagram of an example user equipment.

Referring also to FIG. 5, a UE 500 includes a processor 510, a transceiver 520, and a memory 530 communicatively coupled to each other by a bus 540. The UE 500 may include the components shown in FIG. 5, and may include one or more other components such as any of those shown in FIG. 2 such that the UE 200 may be an example of the UE 500. For example, the processor 510 may include one or more of the components of the processor 210. The transceiver 520 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the transceiver 520 may include the wired transmitter 252 and/or the wired receiver 254. The memory 530 may be configured similarly to the memory 211, e.g., including software with processor-readable instructions configured to cause the processor 510 to perform functions.

The description herein may refer to the processor 510 performing a function, but this includes other implementations such as where the processor 510 executes software (stored in the memory 530) and/or firmware. The description herein may refer to the UE 500 performing a function as shorthand for one or more appropriate components (e.g., the processor 510 and the memory 530) of the UE 500 performing the function. The processor 510 (possibly in conjunction with the memory 530 and, as appropriate, the transceiver 520) may include a PRS measurement unit 560, a PRS measurement reporting unit 570, and a PRS transmission unit 580. The PRS measurement unit 560, the PRS measurement reporting unit 570, and the PRS transmission unit 580 are discussed further below, and the description may refer to the processor 510 generally, or the UE 500 generally, as performing any of the functions of the PRS measurement unit 560, or the PRS measurement reporting unit 570, or the PRS transmission unit 580, with the UE 500 being configured to perform the functions.

The PRS measurement unit 560, the PRS measurement reporting unit 570, and the PRS transmission unit 580 may be configured similarly to the PRS measurement unit 360, the PRS measurement reporting unit 370, and the PRS transmission unit 380 of the TRP 300. The PRS measurement unit 360 and the PRS transmission unit 380 are configured to measure UL-PRS and transmit DL-PRS respectively, while the PRS measurement unit 560 and the PRS transmission unit 580 are configured to measure DL- PRS and transmit UL-PRS. The PRS measurement units 360, 560 may be configured to measure both DL-PRS and UL-PRS (and SL-PRS), and the PRS transmission units 380, 580 may be configured to transmit both DL-PRS and UL-PRS (and SL-PRS). The discussion herein regarding the PRS measurement unit 560, the PRS measurement reporting unit 570, and the PRS transmission unit 580 may refer to PRS generally, or measured DL-PRS and/or transmitted UL-PRS, but the discussion of the UE 500 is applicable to the TRP 300 and the PRS measurement unit 360, the PRS measurement reporting unit 370, and the PRS transmission unit 380 (replacing DL-PRS with UL-PRS and vice versa, as appropriate). For example, the PRS measurement unit 360 measures UL-PRS for RTT positioning.

PRS help with position determination of mobile devices such as the UE 500. For example, various PRS measurements may be used to support UE-assisted and/or UE-based position calculation using one or more of a variety of positioning techniques. For example, DL-PRS may be measured by the PRS measurement unit 560 to determine RSTD for DL-TDOA or to determine RSRP for DL-TDOA, DL-AoD, and/or multi-RTT techniques. As another example, DL-PRS and UL-PRS may be measured by the PRS measurement unit 560 to determine a UE Rx-Tx time difference for multi-RTT. As another example, SSB or CSI-RS (Channel State Information Reference Signal) for RRM (Radio Resource Management) may be measured by the PRS measurement unit 560 to determine SS-RSRP (Synchronization Signal RSRP for RRM), SS-RSRQ (for RRM), CSI-RSRP (for RRM), CSI-RSRQ (for RRM) for E-CID.

Measurement reporting may be triggered reporting (event-based reporting) or periodic reporting (timing-based reporting), e.g., as specified in the 3GPP ($3^{rd}$ Generation Partnership Project) 38.355 Technical Specification. For triggered reporting, occurrence of an event causes reporting of one or more measurements. For example, if a cell-change field is set to TRUE, then a target device (i.e., the device whose location is to be determined, such as a UE) provides requested location information each time the primary cell has changed. A maximum duration for triggered reporting may be set by a reportingDuration field in a request location information IE (information element). Periodic reporting may be configured by a number of reports to be provided (by a reportingAmount field of the IE, with values such as 1, 2, 4, 8, 16, 32, 64) and a reporting interval, e.g., of a time in seconds between each report (such as 1, 2, 4, 8, 10, 16, 20, 32, or 64).

Figure 6:
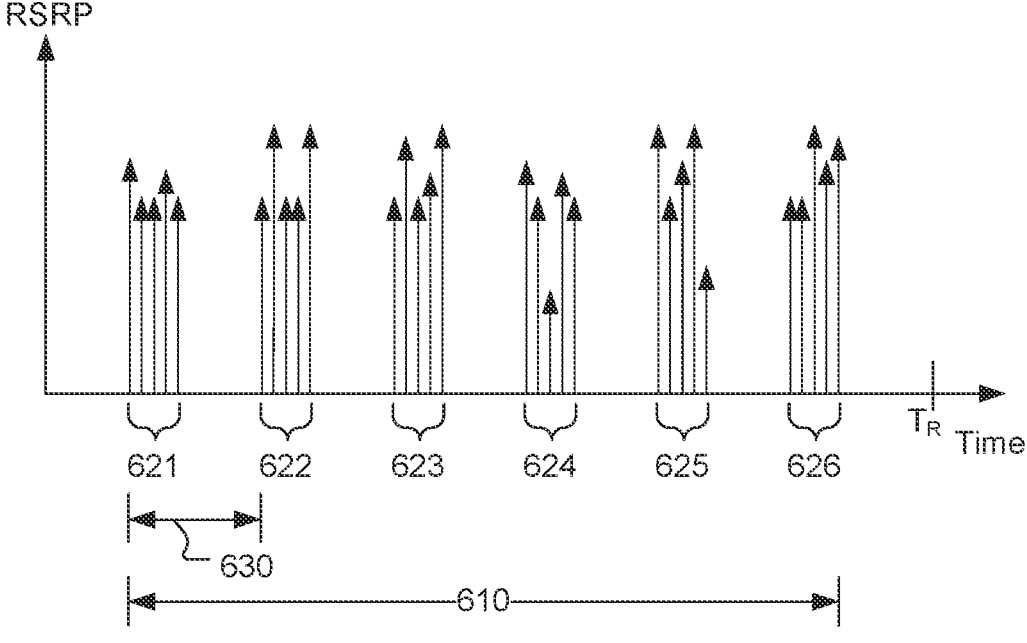
FIG. 6 is a timing diagram of a reporting period and measurements of instances of positioning reference signals.

Referring also to FIG. 6, PRS resource sets may be repeated at a rate specified by an instance periodicity. For example, a dl-PRS-Periodicity-and-ResourceSetSlotOffset parameter may specify a periodicity of PRS instances. A PRS instance periodicity may, for example, be 4, 5, 8, 10, 16, 10, 16, 20, 32, 40, 64, 80, 160, 320, 640, 1280, 2560, 5120, or 10240 milliseconds. If, for example, a reporting period is 1 second, and an instance periodicity is 4 ms, then 250 instances will occur each reporting period. In FIG. 6, a periodicity reporting period 610 includes six PRS instances 621, 622, 623, 624, 625, 626 each comprising PRS resources, with each PRS resource indicated by a respective arrow of respective RSRP magnitude and timing. The PRS instances 621-626 occur with an instance periodicity at an instance interval 630. The instance periodicity is (in this example) greater than the measurement periodicity (i.e., the instance interval 630 is shorter than the reporting period 610), resulting in multiple PRS instances per reporting period. FIG. 6, however, is a simplified example only to provide an illustration, with actual instance periodicities and reporting intervals resulting in many more instances (e.g., hundreds of instances) per reporting interval. Also, the illustration in FIG. 6 assumes that the UE 500 is capable of measuring five PRS resources per instance, and that five PRS resource measurements are obtained for each PRS instance, but other quantities of measurements of PRS resources are possible. The reporting period 610 is the time span during which the PRS instances, for at least some of which one or more PRS resources are to be measured and reported, are received while reporting of the measurements may occur after the reporting period 610, e.g., at a time TR.

Limitations may exist for quantities of measurements. For example, a UE may have a capability of a maximum number of Rx-Tx measurements per PRS source (e.g., TRP for a UE). For example, for a multi-RTT IE, a maxDL-PRS-RxTxTimeDiffMeasPerTRP field may be provided by a UE that specifies a maximum number of UE-Rx-Tx time difference measurements for different DL-PRS resources or DL-PRS resource sets that a UE is capable of measuring per TRP. A UE may provide an indication of a maximum number of UE Rx-Tx time difference measurements corresponding to a single SRS resource/resource set for positioning (DL-PRS resource/resource set) with each measurement corresponding to a single DL-PRS resource/resource set on an indicated frequency band. A UE capability may be different, i.e., different maximums may be provided, for different frequency bands. The UE may provide a capability of the UE for PRS measurement (e.g., maximum number of PRS resources per TRP that the UE can measure), and the server 400 may consider this capability when scheduling PRS and determining a (multi-RTT) reporting configuration (e.g., NR-Multi-RTT-ReportConfig).

The PRS measurement reporting unit 570 is configured to provide measurements and may be configured to provide one or more indications of error associated with failed measurements. For example, the PRS measurement reporting unit 570 may provide an NR-DL-TDOA-TargetDevice-ErrorCauses IE error report indicating (e.g., to the server 400 such as an LMF) one or more error reasons. An error report may provide, for example, one or more indications that the UE 500 was unable to measure a PRS from any TRP, that the UE 500 attempted but was unable to measure one or more neighbor TRPs, that there were not enough signals received for the UE 500 to determine DL-TDOA, and/or that location calculation assistance data were missing.

The PRS measurement reporting unit 570 may be configured to provide a single batch measurement report corresponding to the entire reporting period 610. Batch reporting may help ensure that RTT positioning can be performed by reporting multiple UL-PRS resource measurements such that a UL-PRS can be aligned with corresponding DL-PRS to enable RTT calculations. The PRS measurement reporting unit 570 may report one or more measurement instances (e.g., of RSTD, DL RSRP, and/or UE Rx-Tx) in a single batch measurement report to the server 400, e.g., for UE-assisted positioning, with each measurement instance comprising one or more measurements (of the same or different type) of one or more PRS resources of one or more corresponding PRS instances. A quantity of measurement instances may (at least theoretically) be as high as floor (measurement periodicity/instance periodicity), where floor( ) is the floor function, the measurement periodicity is the window of time for PRS corresponding to a single batch measurement report, and the instance periodicity is the time from the start of one PRS instance to the start of a next PRS instance. For example, for a measurement periodicity of 10 seconds and a PRS periodicity of 4 ms, the theoretical maximum quantity of measurement instances is 2,500. In FIG. 6, the PRS instances 621-626 are shown with RSRP magnitudes and timing and thus the PRS instances 621-626 may be referred to as measurement instances. Similarly, the PRS measurement reporting unit 570 of the TRP 300 may be configured to report one or more measurement instances (e.g., of RTOA, UL RSRP, and/or TRP (e.g., gNB) Rx-Tx time difference measurements) in a single batch measurement report to the server 400. Each measurement instance may be referred to as a sub-report and may have a respective timestamp. The PRS instances 621-626 occur within the reporting period 610, which may also be referred to as a many PRS resources per PRS resource set may be reported. As another example, the PRS measurement reporting unit 570 may be limited as to how many PRS resource measurement elements may be reported in a single batch measurement report (e.g., regardless of how many sub-reports to which the PRS resource measurements correspond), i.e., a total number of PRS measurement elements per batch measurement report. A measurement element may include one or more measurements (e.g., RSRP, RSTD, TDOA) for a single corresponding PRS resource. The PRS measurement reporting unit 570 may be configured to provide a batch measurement report in accordance with the following pseudocode.

```
NR-DL-TDOA-MeasListBatch-r16 ::= SEQUENCE (SIZE(1..nrMaxSubreports)) OF NR-DL-TDOA-
MeasList-r16
NR-DL-TDOA-MeasList-r16 ::= SEQUENCE (SIZE(1..nrMaxTRPs-r16)) OF NR-DL-TDOA-
MeasElement-r16
nrMaxTRPs-r16 = 256
NR-DL-TDOA-MeasElement-r16 ::= SEQUENCE {
    dl-PRS-ID-r16                           INTEGER (0..255),
    nr-PhysCellID-r16                       NR-PhysCellID-r16
    OPTIONAL,
    nr-CellGlobalID-r16                     NCGI-r15
    OPTIONAL,
    nr-ARFCN-r16                            ARFCN-ValueNR-r15
    OPTIONAL,
    nr-DL-PRS-ResourceID-r16               NR-DL-PRS-ResourceID-r16
    OPTIONAL,
    nr-DL-PRS-ResourceSetID-r16            NR-DL-PRS-ResourceSetID-r16
    OPTIONAL,
    nr-TimeStamp-r16                        NR-TimeStamp-r16,
    nr-RSTD-r16                             CHOICE {
        k0-r16                                  INTEGER (0..1970049),
        k1-r16                                  INTEGER (0..985025),
        k2-r16                                  INTEGER (0..492513),
        k3-r16                                  INTEGER (0..246257),
        k4-r16                                  INTEGER (0..123129),
        k5-r16                                  INTEGER (0..61565),
        ...
    },
    nr-AdditionalPathList-r16              NR-AdditionalPathList-r16
        OPTIONAL,
    nr-TimingQuality-r16                    NR-TimingQuality-r16,
    nr-DL-PRS-RSRP-Result-r16              INTEGER (0..126)
    OPTIONAL,
    nr-DL-TDOA-AdditionalMeasurements-r16
                                            NR-DL-TDOA-AdditionalMeasurements-r16
    OPTIONAL,
    ...
}
NR-DL-TDOA-AdditionalMeasurements-r16 ::= SEQUENCE (SIZE (1..3)) OF
                                            NR-DL-TDOA-AdditionalMeasurementElement-
r16
``` measurement window. The reporting period 610 is a time span within which there may be multiple disjointed time spans corresponding to the instances (time spans of the instances being separated in time from each other). The reporting period 610 thus spans a time corresponding to multiple instances but may have one or more portions of time with no PRS.

The UE 500 may be limited as to what measurements may be reported. For example, the PRS measurement unit 560 may be limited in how many PRS resources the PRS measurement unit 560 may measure over the measurement window 610, per measurement instance, and/or per PRS resource set. As another example, the PRS measurement reporting unit 570 may be limited as to how many measurement instances (sub-reports) may be reported (i.e., how many measurement instances may have one or more PRS resource measurements reported) in a single batch measurement report (for a single reporting period 610), how many PRS resource sets per TRP may be reported, and/or how For each of the PRS instances 621-626, the PRS measurement reporting unit 570 reports a sub-report (e.g., NR-DL-TDOA-MeasList in this example). Each MeasList contains a MeasElement for each TRP (that is measured). Each MeasElement (measurement element) contains one or more positioning measurements (here, RSTD, RSRP, Rx-Tx, or any combination thereof) for one or more beams (PRS resources). A batch measurement report (in this example, for DL-TDOA positioning) may include PRS resource measurements for up to a sub-report limit (e.g., nrMaxSubreports) quantity of sub-reports, for selected base stations up to a base station limit (e.g., nrMaxTRPs-r16; 256 in this example) quantity of TRPs per sub-report, and for up to a measurement element limit (in this example, four) quantity of measurement elements per sub-report per TRP. The TRPs, PRS resource sets, and/or PRS resources for which PRS resource measurements are reported (and possibly measured) may be selected by the UE 500 and/or the server 400. For example, the PRS measurement unit 560 may measure PRS resources from different TRPs in different PRS instances, e.g., measuring PRS resources from TRPs in a round-robin fashion. Numerous other examples of selective measuring of PRS resources and/or selective reporting of PRS resource measurements are possible, some of which are discussed herein.

Figure 15A:
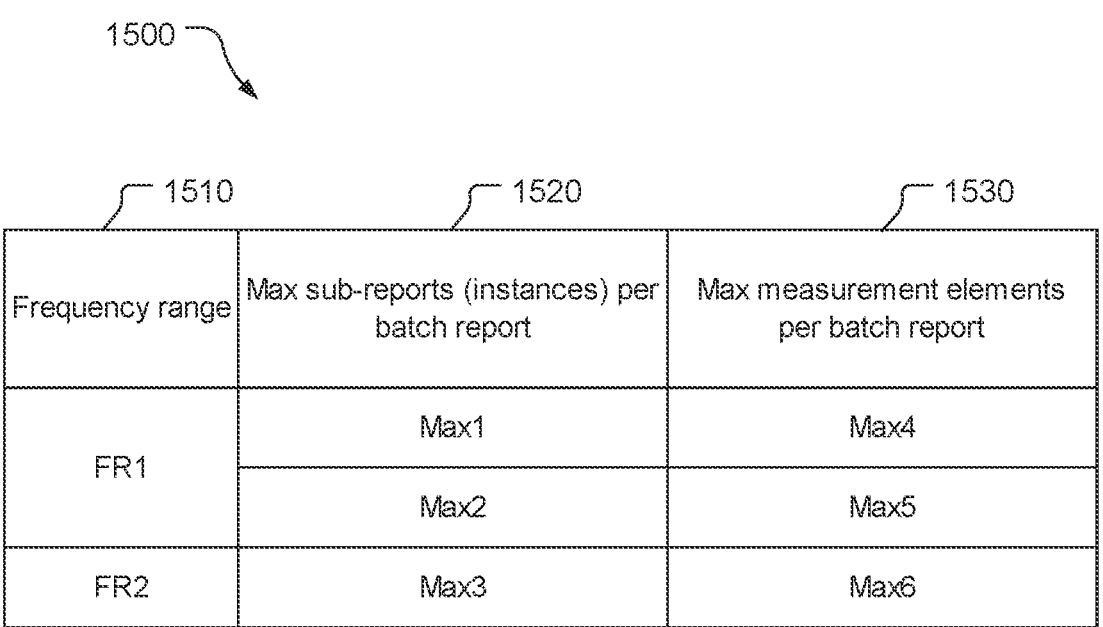
FIG. 15A is a simplified diagram of a capability report showing reporting capacity as a function of frequency range.
Figure 15B:
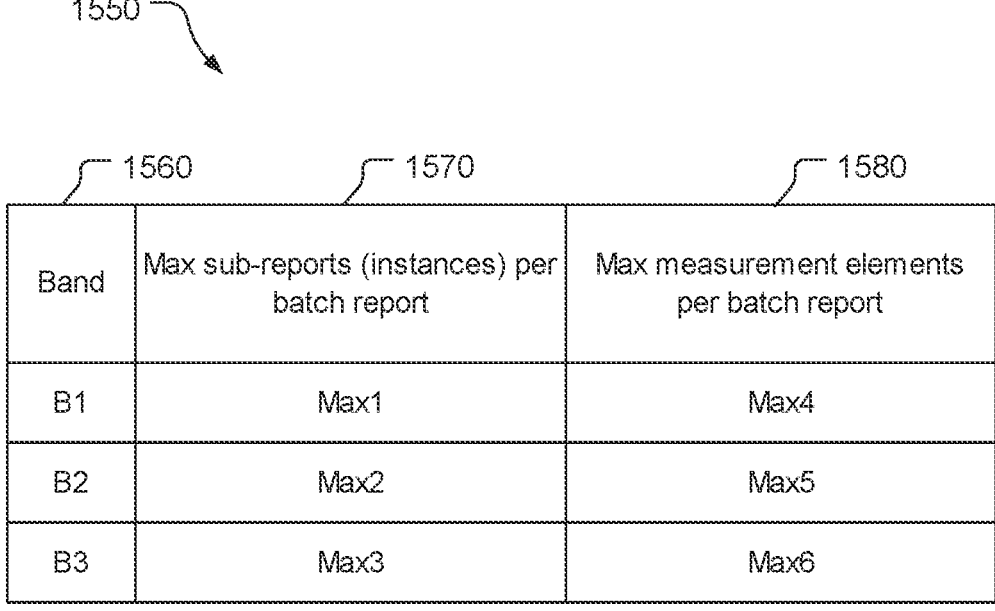
FIG. 15B is a simplified diagram of a capability report showing reporting capacity as a function of frequency band.

Referring also to FIGS. 15A, 15B, the PRS measurement reporting unit 570 may transmit a capability report, e.g., to the server 400 via the transceiver 520, indicating one or more capabilities of the UE 500 regarding reporting of PRS resource measurements. The capability report may indicate one or more reporting capacities of the UE 500 (e.g., maximum number of sub-reports that can be reported, maximum number of measurement elements that can be reported, etc.). For example, a capability report 1500 has a frequency range field 1510, a max sub-reports field 1520, and a max measurement elements field 1530. The max sub-reports field 1520 indicates a maximum number of sub-reports in (corresponding to a maximum number of instances that the UE 500 can measure and report for) each batch measurement report. The max measurement elements field 1530 indicates a maximum number of measurement elements in (corresponding to a maximum number of measurement elements that the UE 500 can measure and report for) each batch measurement report. The field 1520 or the field 1530 may be omitted from the capability report 1500. Thus, the capability report 1500 indicates a reporting capability of the maximum number of measurement instances and/or the maximum number of measurement elements that the UE 500 can include in a single batch measurement report per frequency range (FR). As another example, a capability report 1550 has a frequency band field 1560, a max sub-reports field 1570, and a max measurement elements field 1580. The field 1570 or the field 1580 may be omitted from the capability report 1550. Thus, the capability report 1550 indicates a reporting capability of the maximum number of measurement instances and/or the maximum number of measurement elements that the UE 500 can include in a single batch measurement report per frequency band. Within a sub-report, there may be a maximum number of TRPs from which measurements may be obtained/reported and a maximum number of beams (e.g., four) per TRP from which measurements may be obtained/reported. For example, if a maximum number of sub-reports of 10 is indicated (e.g., Max1=10), a maximum number of TRPs of 256, then the UE 500 may report up to 2,560 measurement elements in a single batch report. The capability report may or may not indicate a reason for a reporting capacity (e.g., a measurement limitation or a reporting limitation regardless of whether there is a measurement limitation). The UE 500 may have a reporting capacity that is less than a measurement capacity, while a measurement capacity may limit a reporting capacity (the UE 500 may measure more PRS resources than the UE 500 is able to report, and may be limited in reporting measurements to no more than the measurements made).

The UE 500 may be capable of reporting PRS resource measurements corresponding to the same PRS source granularity (TRP, TRP resource set, TRP resource) consistently, i.e., for multiple sub-reports (e.g., all sub-reports) in a single batch measurement report. For example, the UE 500 may have a desired reporting consistency of reporting at least one PRS resource measurement corresponding to the same TRP (or the same TPRs) in multiple sub-reports (across multiple PRS instances), or corresponding to the same TRP(s) and the same PRS resource set(s) in multiple sub-reports, or corresponding to the same TRP(s) and the same PRS resource set(s) and the same PRS resource(s) in multiple sub-reports. The PRS measurement reporting unit 570 may be configured to limit the PRS resource measurements reported in order to fulfill a desired reporting consistency, and the PRS measurement unit 560 may be configured to limit measurement of PRS resources to particular PRS resources to fulfill the desired reporting consistency. If consistent reporting is implemented, one or more PRS resource measurements may be reported in addition to the PRS resource measurements for consistent reporting.

The PRS measurement reporting unit 570 may be configured statically and/or dynamically to select PRS resource measurements for consistent reporting. The UE 500 may be statically configured during manufacture, e.g., according to software in the memory 530, installed firmware, etc. The UE 500 may be dynamically configured by one or more instructions received via the transceiver 520 (e.g., from the server 400), where the instruction(s) may override a static configuration of the UE 500 corresponding to the instruction(s). Thus, for example, the server 400 (e.g., the PRS measurement/report requesting unit 470) may send the UE 500 a request to report PRS resource measurements consistently for a specified PRS level. The specified PRS level indicates for what granularity of PRS the reporting consistency is desired, e.g., for the same PRS source (e.g., TRP), the same PRS source and PRS resource set, or the same PRS source and the same PRS resource set and the same PRS resource. Also or alternatively, the request may indicate how the PRS resources for consistency reporting are to be determined (e.g., using a single instance, using multiple instances, using a specified number of instances, for a specified number of PRS resources per instance, etc.).

Figure 7:
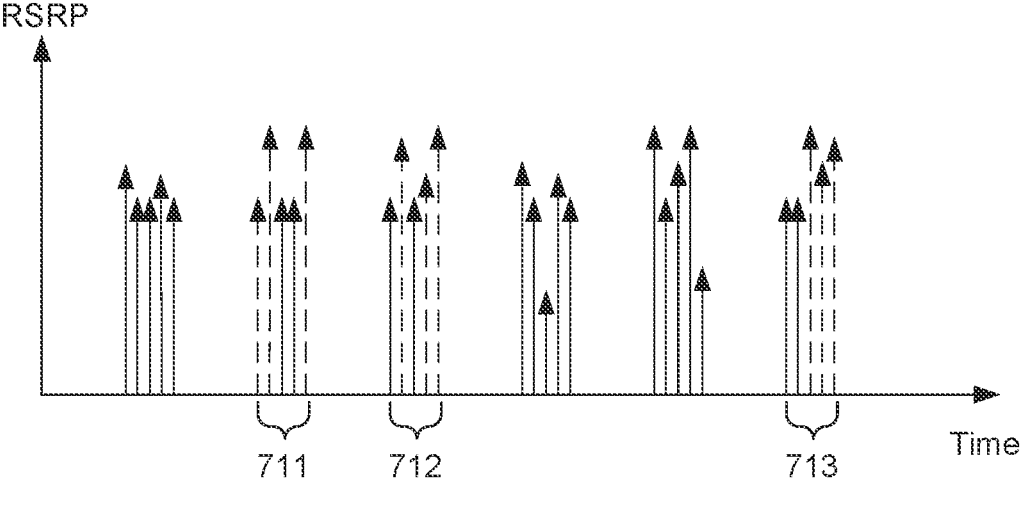
FIG. 7 is a timing diagram of measurements of instances of positioning reference signals, with strongest positioning reference signal measurements of select instances being reported.
Figure 8:
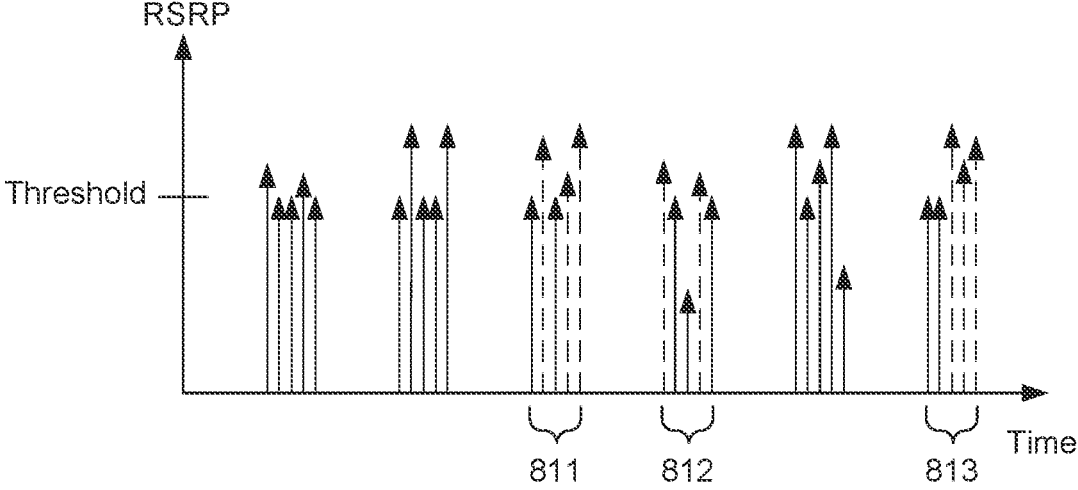
FIG. 8 is a timing diagram of measurements of instances of positioning reference signals, with measurements exceeding a threshold in select instances being reported.

Referring also to FIGS. 7 and 8, if no reporting consistency is required or otherwise implemented by the UE 500, then the UE 500 may select which PRS resource measurements to report. For example, the UE 500 may be configured to determine the desired PRS resources to report based on one or more PRS resource measurements. For example, the PRS measurement reporting unit 570 may be configured to select the N highest-measurement-quality (e.g., highest RSRP) PRS resource measurements in an instance (e.g., in each instance to be reported) for reporting, where N is one or more, and may vary from sub-report to sub-report. This may help improve positioning accuracy and/or reduce latency by reporting only the highest-quality measurement(s). In the example shown in FIG. 7, the UE 500 reports the 3-highest-quality (here, highest RSRP) PRS resource measurements in each reported instance, here instances 711, 712, 713, with reported PRS resource measurements indicated by dashed lines. In the example shown in FIG. 8, the UE 500 reports all of the PRS resource measurements that exceed a threshold quality, here a threshold RSRP, in all instances selected for reporting, here instances 811, 812, 813. The threshold may be statically or dynamically configured. This may help improve positioning accuracy and/or reduce latency by reporting only the measurement(s) meeting a minimum quality threshold.

Figure 9:
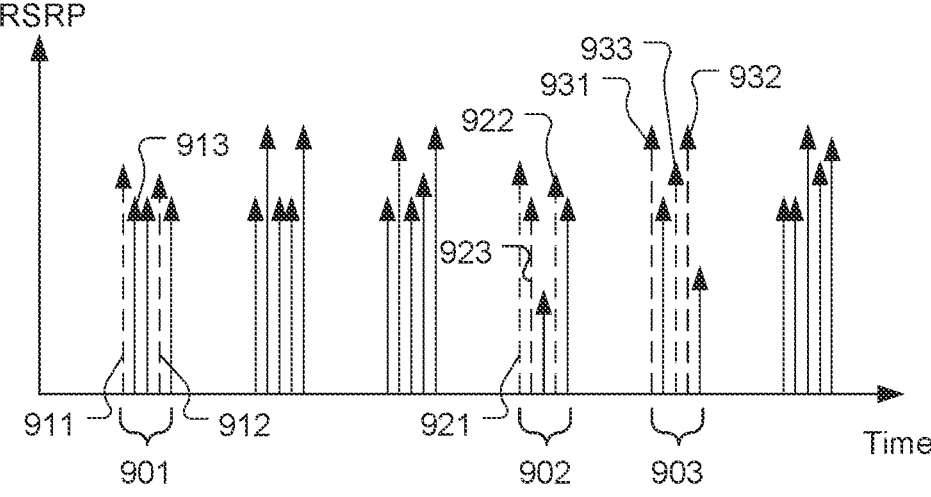
FIG. 9 is a timing diagram of measurements of instances of positioning reference signals, with measurements corresponding to two select positioning reference signal resources of select instances of positioning reference signals being consistently reported along with a strongest remaining measurement in each of the selected instances.

Referring also to FIG. 9, if reporting consistency is implemented by the UE 500, then PRS measurements for the same one or more PRS resources, and/or PRS measurements for the same one or more PRS resource sets, and/or PRS measurements for the same one PRS sources are provided in each of multiple sub-reports (corresponding to multiple PRS instances). For example, as shown in FIG. 9, two PRS resource measurements, here PRS resource measurements 911, 912, 921, 922, 931, 932, corresponding to the same two PRS resources in each of three PRS measurement instances 901, 902, 903 are reported. In addition to the consistent PRS resource measurements, a highest-quality PRS resource measurement in addition to the consistent PRS resource measurements is also reported, here PRS resource measurements 913, 923, 933. If multiple PRS resource measurements tie for the highest quality, then one may be selected according to a rule (e.g., corresponding to the earliest-received PRS resource). The UE 500 may not include the PRS resource ID and/or PRS resource set ID when implementing consistent reporting if doing so would be redundant (e.g., for any sub-report where the respective ID is known). For example, when implementing consistent reporting, the PRS measurement reporting unit 570 may include the appropriate ID(s) in a first sub-report but not in later sub-reports for the same batch report. Especially when implementing consistent reporting, the PRS measurement unit 560 may avoid measuring PRS resources for which PRS resource measurements will not be reported (e.g., will not be reported regardless of measurement quality). Avoiding PRS resource measurements may help conserve power of the UE 500 (e.g., avoid power consumption measuring PRS resources if the measurements will not be used).

Figure 10:
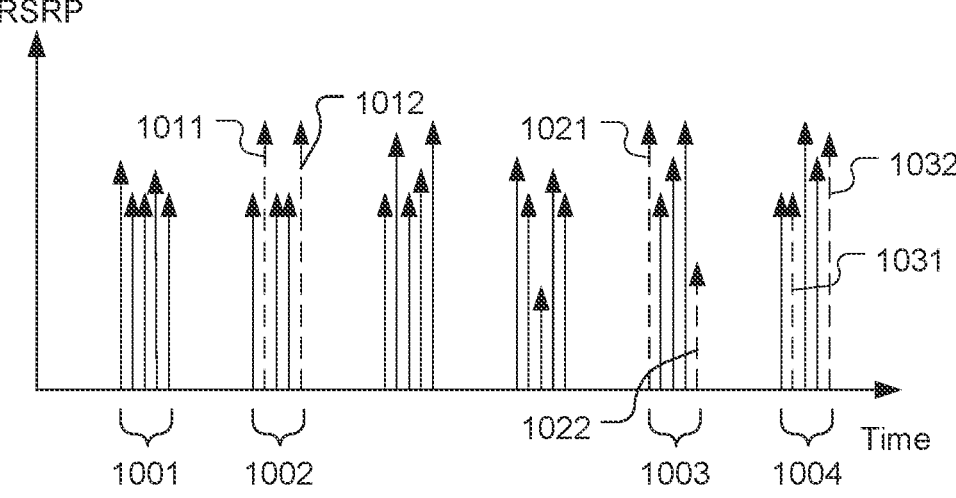
FIG. 10 is a timing diagram of measurements of instances of positioning reference signals, with measurements corresponding to two select positioning reference signal resources of select instances of positioning reference signals being consistently reported.

For implementing reporting consistency, the UE 500 (and/or the TRP 300) may be configured to determine which PRS resources to report (and possibly which PRS resources to measure) based on one or more PRS resource measurements. For example, for consistent reporting of measurements of the same PRS resources, the PRS measurement reporting unit 570 may be configured (statically and/or dynamically) to select the M PRS resources corresponding to the M-highest-quality (e.g., highest RSRP) PRS resource measurements in L selected instances, where M and L are integers of one or greater. For example, the M-highest-quality measurements may be found from the first instance (e.g., the instance 621) in a reporting period (e.g., the reporting period 610), e.g., as shown in FIG. 9 where the two-highest-RSRP PRS resource measurements 911, 912 are found in the instance 901 and reported, and the corresponding PRS resources measured in the instances 902, 903, with the corresponding PRS resource measurements 921, 922, 931, 932 reported. As another example, the M-highest-quality average measurements over multiple instances may be found and used to select PRS resources for consistent reporting. For example, referring also to FIG. 10, PRS resource measurements from PRS instances 1001, 1002 are analyzed to determine the two highest-average-quality PRS resource measurements (in this example, the second and fifth PRS resources in a PRS instance) and PRS resource measurements 1011, 1012, 1021, 1022, 1031, 1032 of the corresponding PRS resources are reported for the PRS instance 1002 and PRS instances 1003, 1004, respectively. In this example, PRS resource measurements from an instance from which no PRS resource measurement is reported is used to determine the PRS resources for consistent measurement reporting, but in another example multiple such instances may be used, and in another example the UE 500 may also, or alternatively only, in order to determine the PRS resource(s) for consistent measurement reporting, use PRS resource measurements from one or more instances from each which at least one PRS resource measurement is to be reported. The M PRS resources corresponding to the M-highest-quality measurements may be measured consistently, in each of the instances whose corresponding sub-report is to be included in the batch report. For consistent reporting of at least one resource of the same PRS resource set(s), the resource set(s) with highest quality (e.g., of a PRS resource in each of the PRS resource set(s)) may be determined and at least one PRS resource (though not necessarily same PRS resource) of the determined PRS resource set(s) measured in each of multiple instances (e.g., the PRS resource measurement reported may be the highest-quality measurement for the PRS resource set, which may vary from one instance to the next). For consistent reporting of at least one PRS resource of the same PRS source(s), the source(s) with highest quality (e.g., of a PRS resource from each of the PRS source(s)) may be determined and at least one PRS resource (though not necessarily same PRS resource, or even from the same PRS resource set) of the determined PRS source(s) measured in each of multiple instances (e.g., the PRS resource measurement reported may be the highest-quality measurement of a PRS resource from the PRS source, which may vary from one instance to the next). As another example, the PRS measurement reporting unit 570 may use measurements from groups of multiple instances over the measurement window to determine which PRS resource measurements to report, e.g., reporting the N-highest-quality resource(s), resource set(s), source(s) across each group.

For implementing reporting consistency, the UE 500 (and/or the TRP 300) may also or alternatively be configured to determine which PRS resources to report (and possibly which PRS resources to measure) based on one or more requests, e.g., received from the server 400. For example, the PRS measurement/report requesting unit 470 may provide values for M and/or L (quantity of highest-quality PRS resource(s), PRS resource set(s), PRS source(s) for consistent reporting and quantity of instances). The server 400 may provide a quantity of instances to use to determine which PRS resource(s), or PRS resource set(s), or PRS source(s) to use for consistent reporting.

The server 400 may request and/or specify one or more of various parameters affecting reporting by the UE 500 (or the TRP 300), and one or more of such parameters may pertain to consistent reporting only, or to consistent and non-consistent reporting. For example, the server 400 may request a particular quantity of sub-reports and/or specify a particular size of the reporting period 610 (measurement window). As another example, the server 400 may specify one or more PRS instances from which to report PRS resource measurement(s), e.g., by specifying instances individually and/or by a range (e.g., a time range within the measurement window). This may help conserve power at the UE 500 by allowing the UE 500 to avoid measurement of PRS resources of instances not specified for measurement (or specified for non-measurement). As another example, the server 400 may request consistent reporting of one or more PRS resource measurements of one or more specified PRS resources, one or more PRS resource measurements of one or more specified PRS resource sets, and/or one or more PRS resource measurements of one or more PRS resources from one or more specified PRS sources. The UE 500 may report PRS resource measurements based on the specified resource(s), resource set(s), and/or source(s), possibly without regard to measurement quality (e.g., at least for specified resource(s)). The server 400 may provide a resource reporting priority for multiple specified PRS resources, a resource set priority for multiple specified PRS resource sets, and/or a source priority for multiple specified PRS sources.

The UE 500 may be configured to determine PRS resource measurements to report based on a request from the server 400 or lack of a request from the server 400. For example, the UE 500 may use the priority(ies) requested by the server 400, and knowledge of scheduled PRS resources for the reporting period 610, to determine which PRS resource measurement(s) to report (or to determine which PRS resource(s) to measure and report corresponding measurement(s)), e.g., prioritize reporting of PRS resource measurement(s) corresponding to prioritized PRS resource(s), prioritized PRS resource set(s), and/or prioritized PRS source(s). With an indicated priority, the server 400 will expect the UE 500 to include measurements for PRS resources that fulfill the requested priority. As another example, without a request from the server 400, and with more instances and/or measurement elements possible in the measurement window than the UE 500 is capable of reporting, then the UE 500 may determine which PRS resources selectively to report (e.g., without selectively measuring) or to determine which PRS resources selectively to measure and report. For example, the PRS measurement unit 560 may measure the earliest-arriving instances up to the limit of the number of instances in the measurement window that the PRS measurement unit 560 can measure. As another example, the PRS measurement unit 560 may measure instances in the measurement window according to a priority sequence of the instances up to the limit of the number of instances in the measurement window that the PRS measurement unit 560 can measure. As another example, the PRS measurement reporting unit 570 may report measurements of the earliest-arriving instances up to the limit of the

```
NR-DL-TDOA-SignalMeasurementInformation-r16 ::= SEQUENCE {
    dl-PRS-ReferenceInfo-r17          SIZE(1..nrMaxNumReportInstances))
    DL-PRS-ID-Info-r16,
    nr-DL-TDOA-MeasList-r17           SIZE(1..nrMaxNumReportInstances))
    NR-DL-TDOA-MeasList-r16,
    ...
}
```

Being able to provide different PRS reference IDs according to this example may provide flexibility of choice for a reference signal for each instance for TDOA measurements.

The PRS measurement reporting unit 570 may be configured to provide different error reports for different sub-reports in the batch report. For example, the PRS measurement reporting unit 570 may provide a different NR-DL-TDOA-TargetDeviceErrorCauses IE error report indicating (e.g., to the server 400 such as an LMF) one or more error reasons for each sub-report of the batch report. The different error reports may provide, for example, one or more respective indications (that may be different in different sub-reports) that the UE 500 was unable to measure a PRS from any TRP, that the UE 500 attempted but was unable to measure one or more neighbor TRPs, that there were not enough signals received for the UE 500 to determine DL-TDOA, and/or that location calculation assistance data were missing. For example, in pseudocode, the PRS measurement reporting unit 570 may be configured to provide error reports as follows.

```
NR-DL-TDOA-ProvideLocationInformation-r16 ::= SEQUENCE {
    nr-DL-TDOA-SignalMeasurementInformation-r16          NR-DL-TDOA-
SignalMeasurementInformation-r16                    OPTIONAL,
    nr-DL-TDOA-Error-r17                             SIZE(1..nrMaxNumReportInstances)
    Sequence OF NR-DL-TDOA-Error-r16                    OPTIONAL,
    ...
}
``` number of instances in the measurement window that the PRS measurement reporting unit 570 can report for a single batch measurement report. As another example, the PRS measurement reporting unit 570 may report measured instances in the measurement window according to a priority sequence of the instances up to the limit of the number of instances in the measurement window that the PRS measurement reporting unit 570 can report for a single batch measurement report.

The PRS measurement reporting unit 570 may be configured to provide different PRS reference IDs for different sub-reports in the batch report. For example, for DL-TDOA, each sub-report may have a respective reference PRS resource (e.g., due to channel variations and/or UE mobility making different reference PRS resources desirable for different instances), with a corresponding different PRS reference ID. The same reference PRS resource may, however, be used for multiple instances. The PRS measurement reporting unit 570 may provide a respective PRS reference ID (for the respective reference PRS resource) for each sub-report in the same batch report. For example, in pseudocode, the PRS measurement reporting unit 570 may be configured to provide signal measurement information as follows.

Figure 11:
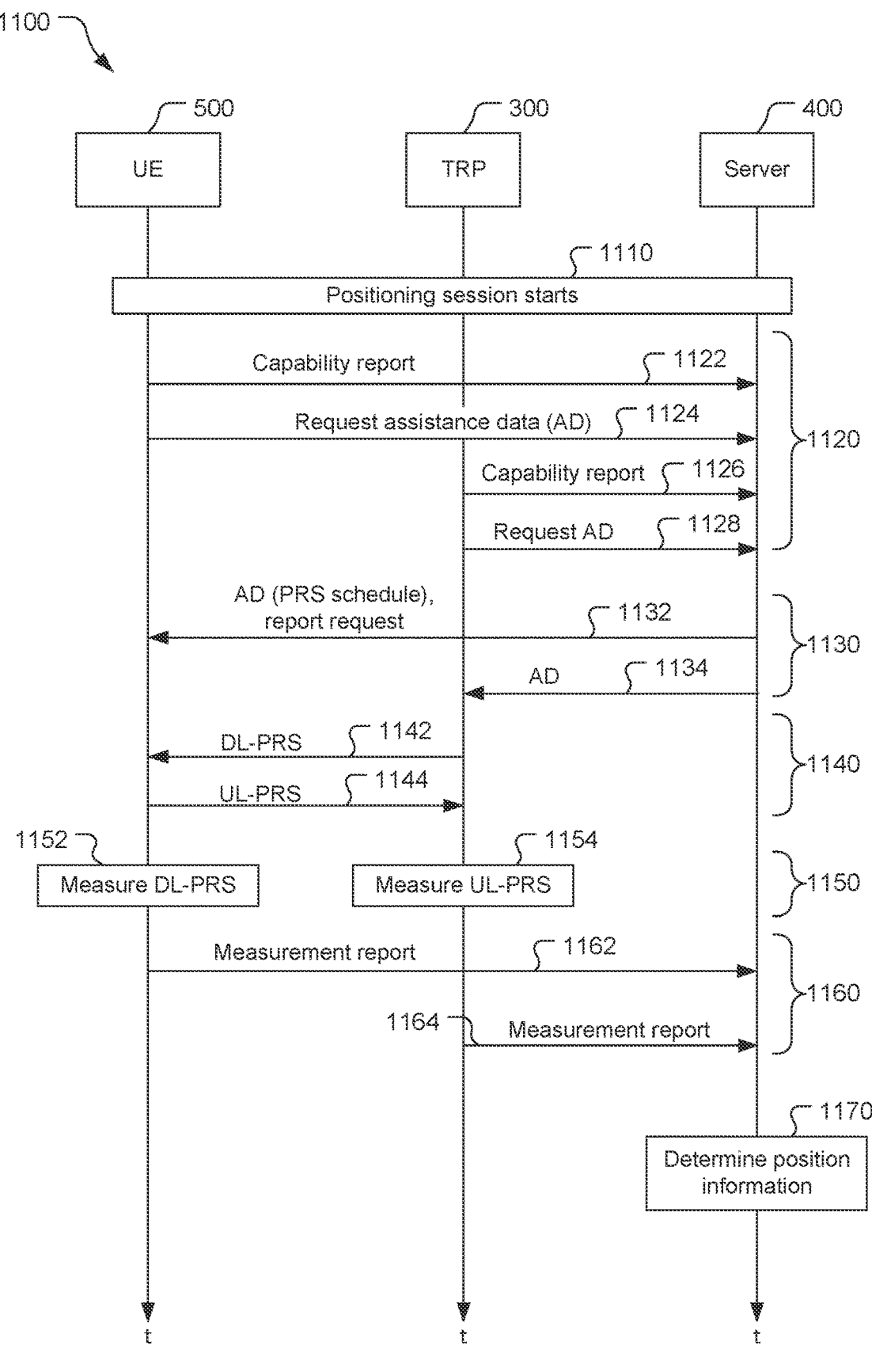
FIG. 11 is a signaling and process flow for providing and measuring PRS, requesting reporting of PRS measurement, reporting PRS measurement, and determining position information.

Referring to FIG. 11, with further reference to FIGS. 1-10, a signaling and process flow 1100 for providing and measuring PRS, requesting reporting of PRS measurement, reporting PRS measurement, and determining position information includes the stages shown. The flow 1100 is an example, as stages may be added, rearranged, and/or removed.

At stage 1110, a positioning session is started. For example, the UE 500 and the server 400 perform a handshaking procedure via the TRP 300 to establish a communication session for exchanging signaling for use in determining a position (location) of the UE 500.

At stage 1120, the UE 500 may transmit a capability report 1122 and a request 1124 for assistance data (AD), and/or the TRP 300 may transmit a capability report 1126 and a request 1128 for AD. The PRS measurement unit 560 and/or the PRS measurement reporting unit 570 may transmit the capability report 1122 indicating one or more capabilities of the UE 500 for measuring and/or reporting PRS (e.g., maximum DL-PRS resources measurable by the UE 500, maximum DL-PRS for which measurements may be reported, maximum sub-reports per batch report, etc.). For example, the report 1122 may explicitly indicate a capacity in measurement elements and/or sub-reports that may be reported as part of a batch measurement report (e.g., based on frequency of the DL-PRS, e.g., per frequency range or per frequency band). The report 1122, for example, may include the report 1500 and/or the report 1550. The report 1122 may implicitly indicate a capacity in measurement elements and/or sub-reports that may be reported as part of a batch measurement report, e.g., by indicating a capacity in measurement elements and/or instances that may be measured by the UE 500. The report 1122 may indicate a processing (measuring and/or reporting) priority (e.g., whether instances will be prioritized by order received or another order). The report 1122 may indicate that the UE 500 is capable of providing consistent reporting by ensuring reporting of measurements of consistent PRS level across multiple measurement instances. The report 1126 may include indications similar to the report 1122 but for the TRP 300. The UE 500 (e.g., the PRS measurement unit 560) may transmit the request 1124 to help the PRS measurement unit 560 measure incoming PRS. The capability report 1126 may include indications, similar to those in the capability report 1122, of one or more capabilities of the TRP 300 for measuring and/or reporting PRS (UL-PRS for the capability report 1126). The TRP 300 may transmit the request 1128 to help the PRS measurement unit 360 measure incoming PRS.

At stage 1130, the server 400 determines and transmits AD 1132 to the UE 500 and/or transmits AD 1134 to the TRP 300. The PRS scheduling unit 460 determines one or more PRS schedules (e.g., for DL-PRS and/or UL-PRS). The PRS scheduling unit 460 may be configured to determine the PRS schedule based on, or independently of, content of one or more of the capability reports 1122, 1126 and/or based on, or independently of, the one or more of the requests 1124, 1128. For example, the PRS schedule(s) may be based on measurement and/or reporting capacity of the UE 500 and/or the TRP 300. The AD 1132 and/or the AD 1134 may include an indication of the measurement window 610. The AD 1132 and/or the AD 1134 may include a report request. For example, the PRS measurement/report requesting unit 470 may specify one or more priorities of PRS resource measurements to be reported, a request for reporting consistency (e.g., indicating a PRS level for PRS resource measurement consistency), one or more specified instances from which to report at least one PRS resource measurement, one or more parameters for determining what PRS source(s), what PRS resource set(s), and/or what PRS resource(s) for which to report PRS resource measurement consistently, etc.

At stage 1140, the TRP 300 transmits DL-PRS 1142 to the UE 500 and/or the UE 500 transmits UL-PRS 1144 to the TRP 300. For example, the PRS transmission unit 380 may transmit, to the UE 500, the DL-PRS 1142 in accordance with the DL-PRS schedule indicated in the AD 1132, 1134. The PRS transmission unit 580 may transmit, to the TRP 300, the UL-PRS 1144 in accordance with the UL-PRS schedule indicated in the AD 1132, 1134.

At stage 1150, the UE 500 may measure at least some of the DL-PRS 1142 and/or the TRP 300 may measure at least some of the UL-PRS 1144. For example, at sub-stage 1152, the PRS measurement unit 560 may measure PRS, e.g., up to a PRS measurement limit. The PRS measurement unit 560 may, for example, measure all of the DL-PRS 1142 or less than all of the DL-PRS 1142, e.g., may measure select PRS resources, e.g., based on the report request in the AD 1132 and/or one or more PRS resource measurements to determine future reporting consistency and avoiding measuring of PRS resources other than PRS resources to satisfy the reporting consistency. Also or alternatively, at sub-stage 1154, the PRS measurement unit 360 may, for example, measure all of the UL-PRS 1144 or less than all of the UL-PRS 1144.

At stage 1160, the UE 500 may report measured PRS and/or the TRP 300 may report measured PRS. For example, the PRS measurement reporting unit 570 may transmit a PRS measurement report 1162 to the server 400 (directly or via the TRP 300). The PRS measurement report 1162 may comprise one or more messages (e.g., separate messages). The report 1162 includes one or more measurements each corresponding to a PRS resource (e.g., each measurement corresponding to one or more PRS resources, or one or more PRS resources of one or more PRS resource sets, or one or more PRS resources corresponding to one or more PRS sources). The report 1162 may include measurements for consistent reporting (e.g., measurement of the same PRS resource repeatedly, measurements for the same PRS resource set, and/or measurements for the same PRS source(s) (TRP(s))) over multiple sub-reports of a batch report. The report 1162 may include measurements in addition to or instead of measurements for consistent reporting. The report 1164 may include one or more messages and may include measurements for consistent reporting and/or measurements independent of measurements for consistent reporting (e.g., for reporting of measurements for one or more PRS sources (e.g., UEs) over multiple sub-reports. Either or both of the reports 1162, 1164 may include other position information (e.g., pseudoranges, location estimates) in addition to PRS resource measurements.

At stage 1170, the server 400 determines position information. For example, the processor 410 may use the measurement report(s) 1162, 1164 to determine one or more pseudoranges and/or one or more location estimates of the UE 500 (the target UE) using one or more appropriate positioning techniques (e.g., RTT, multi-RTT, DL-TDOA, UL-TDOA, etc.).

Referring to FIG. 12, with further reference to FIGS. 1-11, a method 1200 of reporting positioning measurement reporting capability includes the stages shown. The method 1200 is, however, an example and not limiting. The method 1200 may be altered, e.g., by having stages added, removed, rearranged, combined, performed concurrently, and/or having single stages split into multiple stages.

At stage 1210, the method 1200 includes establishing a positioning session between a telecommunication device and a network entity. For example, the UE 500 exchanges one or more messages with the server 400 via the TRP 300 to establish a positioning session at stage 1110. The processor 510, possibly in combination with the memory 530, in combination with the transceiver 520 (e.g., the wireless transmitter 242, the wireless receiver 244, and the antenna 246) may comprise means for establishing the positioning session. Also or alternatively, the processor 310, possibly in combination with the memory 311, in combination with the transceiver 315 (e.g., the wireless transmitter 342, the wireless receiver 344, and the antenna 346) may comprise means for establishing the positioning session.

At stage 1220, the method 1200 includes transmitting, from the telecommunication device to the network entity, a capability report indicating a measurement reporting capacity for a batch measurement report of measurements of a plurality of PRS instances. For example, at stage 1120, the UE 500 transmits the capability report 1122 and/or the TRP 300 transmits the capability report 1126. The processor 510, possibly in combination with the memory 530, in combination with the transceiver 520 (e.g., the wireless transmitter 242, and the antenna 246) may comprise means for transmitting the first capability report. Also or alternatively, the processor 310, possibly in combination with the memory 311, in combination with the transceiver 315 (e.g., the wireless transmitter 342 and the antenna 346), may comprise means for transmitting the first capability report.

Implementations of the method 1200 may include one or more of the following features. In an example implementation, the measurement reporting capacity comprises a quantity of measurement sub-reports each corresponding to a respective one of the plurality of PRS instances. For example, the capability report(s) 1122, 1126 may indicate a maximum number of sub-reports per batch measurement report. In another example implementation, the measurement reporting capacity comprises a quantity of measurement elements each corresponding to a respective one of the plurality of PRS instances and to a PRS source. For example, the capability report 1122 may indicate a maximum number of measurement elements for a combination of TRP(s) and instances and/or the capability report 1126 may indicate a maximum number of measurement elements for a combination of UE(s) and instances. In another example implementation, the capability report indicates that the telecommunication device is capable of ensuring that the measurements of the plurality of PRS instances include PRS resource measurements of consistent PRS level. For example, the capability report 1122, 1126 may indicate generally that the telecommunication device (e.g., the UE 500 or the TRP 300) can provide consistent reporting, and may provide one or more details regarding consistent reporting (e.g., what level(s) of PRS can be consistently reported (source, resource set, resource), etc.). In another example implementation, the capability report indicates the measurement reporting capacity as a function of a frequency of PRS resources of the plurality of PRS instances. For example, the capability report may include the capability report 1500 and/or the capability report 1550 indicating maximum sub-reports per batch report and/or maximum measurement elements per batch report as a function of frequency range or frequency band, respectively. In another example implementation, the capability report indicates a processing priority of the plurality of PRS instances. For example, the capability report may indicate a processing (measuring and/or reporting) priority of the instances (e.g., whether instances will be prioritized by order received or another order, and thus which measurements will be made/reported if the number of instances exceeds the number of instances that can be measured and/or reported).

Referring to FIG. 13, with further reference to FIGS. 1-11, a positioning measurement reporting method 1300 includes the stages shown. The method 1300 is, however, an example and not limiting. The method 1300 may be altered, e.g., by having stages added, removed, rearranged, combined, performed concurrently, and/or having single stages split into multiple stages.

At stage 1310, the method 1300 includes receiving, at a telecommunication device, a schedule of a plurality of scheduled PRS resources (positioning reference signal resources) corresponding to a plurality of PRS instances and corresponding to a time span, the plurality of scheduled PRS resources comprising a first plurality of PRS resources and a second plurality of PRS resources that is separate from the first plurality of PRS resources. For example, at stage 1130 shown in FIG. 11, the UE 500 receives the PRS schedule in the AD 1132 and/or the TRP 300 receives the PRS schedule in the AD 1134. The processor 510, possibly in combination with the memory 530, in combination with the transceiver 520 (e.g., the wireless receiver 244 and the antenna 246), and/or the processor 310, possibly in combination with the memory 311, in combination with the transceiver 315 (e.g., the wireless receiver 344 and the antenna 346), may comprise means for receiving the schedule of the plurality of scheduled PRS resources. The scheduled PRS resources may be DL-PRS resources (e.g., if the telecommunication device is the UE 500), UL-PRS resources (e.g., if the telecommunication device is the TRP 300), or a combination thereof.

At stage 1320, the method 1300 includes transmitting, from the telecommunication device to a network entity, a batch measurement report corresponding to the time span and comprising a plurality of PRS resource measurements each corresponding to a respective PRS resource of the second plurality of PRS resources. For example, at stage 1160, the UE 500 transmits the measurement report 1162 and/or the TRP transmits the measurement report 1164 to the server 400, with the measurement report 1162, 1164 comprising a single measurement report of measurements corresponding to multiple PRS instances of a measurement window, e.g., at least some of the instances 621-626 corresponding to the measurement window 610. The processor 510, possibly in combination with the memory 530, in combination with the transceiver 520 (e.g., the wireless transmitter 242 and the antenna 246), and/or the processor 310, possibly in combination with the memory 311, in combination with the transceiver 315 (e.g., the wireless transmitter 342 and the antenna 346), may comprise means for transmitting the batch measurement report.

At stage 1330, the method 1300 includes providing consistent reporting across a plurality of measurement sub-reports of the batch measurement report by ensuring that at least two of the plurality of PRS resource measurements correspond to a same PRS level and that each of the at least two of the plurality of PRS resource measurements corresponds to a respective different one of the plurality of PRS instances. For example, at stage 1160, each of the measurement report(s) 1162, 1164 includes consistently reported PRS measurement with PRS resource measurements reported for the same PRS resource(s) for multiple PRS instances and/or PRS resource measurements reported for the same PRS resource set(s) for multiple PRS instances and/or PRS resource measurements reported for the same PRS source(s) for multiple PRS instances. The processor 510, possibly in combination with the memory 530, in combination with the transceiver 520 (e.g., the wireless transmitter 242 and the antenna 246), and/or the processor 310, possibly in combination with the memory 311, in combination with the transceiver 315 (e.g., the wireless transmitter 342 and the antenna 346), may comprise means for providing consistent reporting.

Implementations of the method 1300 may include one or more of the following features. In an example implementation, the same PRS level comprises a same PRS resource, or a same PRS resource set, or a same PRS source. For example, the UE 500 or the TRP 300 may consistently report PRS measurements for the same PRS resource(s) for multiple PRS instances, PRS resource measurements for the same PRS resource set(s) for multiple PRS instances, and/or PRS resource measurements for the same PRS source(s) for multiple PRS instances. In another example implementation, the method 1300 comprises providing the consistent reporting based on a request received from the network entity. For example, the UE 500 and/or the TRP 300 may determine what PRS level to report consistently, and/or for what PRS resource measurements to provide the reporting consistency, based on the request(s) in the AD 1132, 1134 from the server 400. In another example implementation, the method 1300 comprises selecting the at least two of the plurality of PRS resource measurements based on measurements of a subset of the plurality of scheduled PRS resources. For example, the PRS source(s), PRS resource set(s), and/or PRS resource(s) for which to report PRS resource measurements consistently may be determined from measurement quality of PRS resource measurements (e.g., the N-highest-quality PRS resource measurements for corresponding PRS resources, PRS resource set(s), or PRS source(s)).

Also or alternatively, implementations of the method 1300 may include one or more of the following features. In an example implementation, the first plurality of PRS resources corresponds to a first subset of the plurality of PRS instances and the second plurality of PRS resources corresponds to a second subset of the plurality of PRS instances, and the method 1300 comprises providing the consistent reporting by ensuring that the plurality of PRS resource measurements include at least one PRS resource measurement, corresponding to the same PRS level, for every one of the second subset of the plurality of PRS instances in the batch measurement report. For example, PRS resource measurements for the same PRS resource(s), the same PRS resource set(s), and/or the same PRS source(s) may be provided for every PRS instance for which a PRS resource measurement is provided in the batch measurement report. In another example implementation, the plurality of measurement sub-reports comprises a first measurement sub-report and a second measurement sub-report each corresponding to a respective one of the plurality of PRS instances, and the method 1300 comprises determining which one or more of the plurality of PRS resource measurements to include in the first measurement sub-report regardless of which one or more of the plurality of PRS resource measurements are included in the second measurement sub-report. For example, the UE 500 or the TRP 300 may determine on an instance-by-instance basis which PRS measurements to include in the batch measurement report without concern for reporting consistency. In another example implementation, each of the plurality of measurement sub-reports corresponds to a respective one of the plurality of PRS instances and includes a respective reference PRS identifier. Each sub-report of the batch report may include an ID of the reference PRS resource for the corresponding PRS instance, with different PRS instances possibly having different reference PRS resources (and thus different reference PRS IDs). In a further example implementation, the respective reference PRS identifier is provided in each of the plurality of measurement sub-reports based on the plurality of measurement sub-reports being for TDOA positioning. In another example implementation, each of the plurality of measurement sub-reports corresponds to a respective one of the plurality of PRS instances and includes a respective error report. In another example implementation, the method 1300 comprises determining for which of the plurality of PRS instances to include respective ones of the plurality of PRS resource measurements in the batch measurement report based on an instance reporting request received from the network entity. For example, the UE 500 and/or the TRP 300 may determine from which PRS instances to include PRS resource measurements in the batch report (and may determine from which PRS instances to measure one or more respective PRS resources) based on a reporting request in the AD 1132 and/or the AD 1134. The processor 510, possibly in combination with the memory 530, in combination with the transceiver 520 (e.g., the wireless receiver 244 and the antenna 246), and/or the processor 310, possibly in combination with the memory 311, in combination with the transceiver 315 (e.g., the wireless receiver 344 and the antenna 346), may comprise means for determining for which of the plurality of PRS instances to include respective ones of the plurality of PRS resource measurements in the batch measurement report.

Referring to FIG. 14, with further reference to FIGS. 1-11, a method 1400 for affecting positioning reference signal reporting includes the stages shown. The method 1400 is, however, an example and not limiting. The method 1400 may be altered, e.g., by having stages added, removed, rearranged, combined, performed concurrently, and/or having single stages split into multiple stages.

At stage 1410, the method 1400 includes receiving, at a server from a telecommunication device, a batch measurement report indicative of a plurality of PRS resource measurements (positioning reference signal PRS resource measurements) of first PRS resources from a plurality of scheduled PRS resources comprising the first PRS resources and comprising second PRS resources and arranged in a plurality of PRS instances. For example, at stage 1160, the server 400 receives the measurement report 1162 and/or the measurement report 1164. The processor 410, possibly in combination with the memory 411, in combination with the transceiver 415 (e.g., the wireless receiver 444 and the antenna, and/or the wired receiver 454), may comprise means for receiving the batch measurement report.

At stage 1420, the method 1400 includes transmitting, from the server to the telecommunication device, a report request that: is indicative of which one or more of the plurality of PRS instances for the telecommunication device to measure; or requests the telecommunication device to provide consistent reporting across sub-reports of the batch measurement report by ensuring that at least two of the plurality of PRS resource measurements correspond to a same PRS level and that each of the at least two of the plurality of PRS resource measurements corresponds to a respective different one of the plurality of PRS instances; or provides a reporting consistency parameter for consistent reporting provided by the telecommunication device to meet; or any combination thereof. For example, the server 400 transmits a reporting request (e.g., in the AD 1132, 1134) requesting the UE 500 and/or the TRP 300, respectively, to report one or more PRS resource measurements from one or more specified PRS instances, and/or requesting the UE 500 and/or the TRP 300, respectively, to consistently report PRS measurement across multiple PRS instances for the same PRS level, and/or providing information for determining consistent reporting (e.g., requesting a PRS level for consistent reporting, providing a requirement to follow in determining what PRS level or what PRS item(s) (PRS resource(s), PRS resource set(s), PRS source(s)) for which to report PRS measurements consistently). The processor 410, possibly in combination with the memory 411, in combination with the transceiver 415 (e.g., the wireless transmitter 442 and the antenna, and/or the wired transmitter 452), may comprise means for transmitting the report request.

Implementations of the method 1400 may include one or more of the following features. In an example implementation, the report request indicates a particular instance of the plurality of PRS instances for the telecommunication device to measure. In another example implementation, the report request indicates a window of time corresponding to a subset of the plurality of PRS instances for the telecommunication device to measure. For example, the server 400 may indicate a contiguous range of time within the measurement window 610 for which PRS instances are to be measured. PRS instances outside of this window may not be measured, thus saving energy. In another example implementation, the report request provides the reporting consistency parameter, and the reporting consistency parameter comprises an indication of a PRS source, an indication of a PRS resource set, or an indication of a particular PRS resource of the plurality of scheduled PRS resources, or any combination thereof. For example, the server 400 may specify one or more PRS sources from which PRS resource measurement is to be provided in multiple sub-reports, and/or may specify one or more PRS resource sets from which PRS resource measurement is to be provided in multiple sub-reports, and/or may specify one or more PRS resources of which measurement is to be provided in multiple sub-reports. In another example implementation, the report request provides the reporting consistency parameter, and the reporting consistency parameter comprises a first quantity of PRS items for which to provide consistent reporting, or a second quantity of the plurality of PRS instances from which to use PRS reference measurements to determine a particular PRS item for which to provide consistent reporting, or a combination thereof. For example, the server 400 may specify an amount of PRS sources from which PRS resource measurement is to be provided in multiple sub-reports, and/or may specify an amount of PRS resource sets from which PRS resource measurement is to be provided in multiple sub-reports, and/or may specify an amount of PRS resources of which measurement is to be provided in multiple sub-reports, and/or an amount of instances from each of which to use at least one PRS resource measurement as one or more references to determine which PRS source(s), PRS resource set(s), and/or PRS resource(s) for which to report PRS resource measurement for multiple sub-reports.

IMPLEMENTATION EXAMPLES

Implementation examples are provided in the following numbered clauses.

1. A telecommunication device comprising:
   a transceiver;
   a memory; and
   a processor, communicatively coupled to the transceiver and the memory,
   configured to:
      receive a schedule of a plurality of scheduled PRS resources (positioning reference signal resources) corresponding to a plurality of PRS instances and corresponding to a time span, the plurality of scheduled PRS resources comprising a first plurality of PRS resources and a second plurality of PRS resources that is separate from the first plurality of PRS resources;
      transmit, via the transceiver to a network entity, a batch measurement report corresponding to the time span and comprising a plurality of PRS resource measurements each corresponding to a respective PRS resource of the second plurality of PRS resources; and
      provide consistent reporting across a plurality of measurement sub-reports of the batch measurement report by ensuring that at least two of the plurality of PRS resource measurements correspond to a same PRS level and that each of the at least two of the plurality of PRS resource measurements corresponds to a respective different one of the plurality of PRS instances.

2. The telecommunication device of clause 1, wherein the same PRS level comprises a same PRS resource, or a same PRS resource set, or a same PRS source.

3. The telecommunication device of clause 1, wherein the processor is configured to provide the consistent reporting based on a request received via the transceiver from the network entity.

4. The telecommunication device of clause 1, wherein the processor is configured to select the at least two of the plurality of PRS resource measurements based on measurements of a subset of the plurality of scheduled PRS resources.

5. The telecommunication device of clause 1, wherein the first plurality of PRS resources corresponds to a first subset of the plurality of PRS instances and the second plurality of PRS resources corresponds to a second subset of the plurality of PRS instances, and wherein to provide the consistent reporting the processor is configured to ensure that the plurality of PRS resource measurements include at least one PRS resource measurement, corresponding to the same PRS level, for every one of the second subset of the plurality of PRS instances in the batch measurement report.

6. The telecommunication device of clause 1, wherein the plurality of measurement sub-reports comprises a first measurement sub-report and a second measurement sub-report each corresponding to a respective one of the plurality of PRS instances, and wherein the processor is further configured to determine which one or more of the plurality of PRS resource measurements to include in the first measurement sub-report regardless of which one or more of the plurality of PRS resource measurements are included in the second measurement sub-report.

7. The telecommunication device of clause 1, wherein each of the plurality of measurement sub-reports corresponds to a respective one of the plurality of PRS instances and includes a respective reference PRS identifier.

8. The telecommunication device of clause 7, wherein the processor is configured to provide the respective reference PRS identifier in each of the plurality of measurement sub-reports based on the plurality of measurement sub-reports being for time-difference-of-arrival positioning.

9. The telecommunication device of clause 1, wherein each of the plurality of measurement sub-reports corresponds to a respective one of the plurality of PRS instances and includes a respective error report.

10. The telecommunication device of clause 1, wherein the processor is configured to determine for which of the plurality of PRS instances to include respective ones of the plurality of PRS resource measurements in the batch measurement report based on an instance reporting request received from the network entity via the transceiver.

11. A positioning measurement reporting method comprising:
   receiving, at a telecommunication device, a schedule of a plurality of scheduled PRS resources (positioning reference signal resources) corresponding to a plurality of PRS instances and corresponding to a time span, the plurality of scheduled PRS resources comprising a first plurality of PRS resources and a second plurality of PRS resources that is separate from the first plurality of PRS resources;
   transmitting, from the telecommunication device to a network entity, a batch measurement report corresponding to the time span and comprising a plurality of PRS resource measurements each corresponding to a respective PRS resource of the second plurality of PRS resources; and providing consistent reporting across a plurality of measurement sub-reports of the batch measurement report by ensuring that at least two of the plurality of PRS resource measurements correspond to a same PRS level and that each of the at least two of the plurality of PRS resource measurements corresponds to a respective different one of the plurality of PRS instances.

12. The method of clause 11, wherein the same PRS level comprises a same PRS resource, or a same PRS resource set, or a same PRS source.

13. The method of clause 11, wherein the method comprises providing the consistent reporting based on a request received from the network entity.

14. The method of clause 11, the method further comprising selecting the at least two of the plurality of PRS resource measurements based on measurements of a subset of the plurality of scheduled PRS resources.

15. The method of clause 11, wherein the first plurality of PRS resources corresponds to a first subset of the plurality of PRS instances and the second plurality of PRS resources corresponds to a second subset of the plurality of PRS instances, and wherein the method comprises providing the consistent reporting by ensuring that the plurality of PRS resource measurements include at least one PRS resource measurement, corresponding to the same PRS level, for every one of the second subset of the plurality of PRS instances in the batch measurement report.

16. The method of clause 11, wherein the plurality of measurement sub-reports comprises a first measurement sub-report and a second measurement sub-report each corresponding to a respective one of the plurality of PRS instances, the method further comprising determining which one or more of the plurality of PRS resource measurements to include in the first measurement sub-report regardless of which one or more of the plurality of PRS resource measurements are included in the second measurement sub-report.

17. The method of clause 11, wherein each of the plurality of measurement sub-reports corresponds to a respective one of the plurality of PRS instances and includes a respective reference PRS identifier.

18. The method of clause 17, wherein the respective reference PRS identifier is provided in each of the plurality of measurement sub-reports based on the plurality of measurement sub-reports being for time-difference-of-arrival positioning.

19. The method of clause 11, wherein each of the plurality of measurement sub-reports corresponds to a respective one of the plurality of PRS instances and includes a respective error report.

20. The method of clause 11, further comprising determining for which of the plurality of PRS instances to include respective ones of the plurality of PRS resource measurements in the batch measurement report based on an instance reporting request received from the network entity.

21. A telecommunication device comprising:

means for receiving a schedule of a plurality of scheduled PRS resources (positioning reference signal resources) corresponding to a plurality of PRS instances and corresponding to a time span, the plurality of scheduled PRS resources comprising a first plurality of PRS resources and a second plurality of PRS resources that is separate from the first plurality of PRS resources;

means for transmitting, to a network entity, a batch measurement report corresponding to the time span and comprising a plurality of PRS resource measurements each corresponding to a respective PRS resource of the second plurality of PRS resources; and means for providing consistent reporting across a plurality of measurement sub-reports of the batch measurement report by ensuring that at least two of the plurality of PRS resource measurements correspond to a same PRS level and that each of the at least two of the plurality of PRS resource measurements corresponds to a respective different one of the plurality of PRS instances.

22. The telecommunication device of clause 21, wherein the same PRS level comprises a same PRS resource, or a same PRS resource set, or a same PRS source.

23. The telecommunication device of clause 21, wherein the means for providing consistent reporting comprises means for providing consistent reporting based on a request received from the network entity.

24. The telecommunication device of clause 21, wherein the telecommunication device further comprises means for selecting the at least two of the plurality of PRS resource measurements based on measurements of a subset of the plurality of scheduled PRS resources.

25. The telecommunication device of clause 21, wherein the first plurality of PRS resources corresponds to a first subset of the plurality of PRS instances and the second plurality of PRS resources corresponds to a second subset of the plurality of PRS instances, and wherein the means for providing consistent reporting comprise means for ensuring that the plurality of PRS resource measurements include at least one PRS resource measurement, corresponding to the same PRS level, for every one of the second subset of the plurality of PRS instances in the batch measurement report.

26. The telecommunication device of clause 21, wherein the plurality of measurement sub-reports comprises a first measurement sub-report and a second measurement sub-report each corresponding to a respective one of the plurality of PRS instances, and wherein the telecommunication device further comprises means for determining which one or more of the plurality of PRS resource measurements to include in the first measurement sub-report regardless of which one or more of the plurality of PRS resource measurements are included in the second measurement sub-report.

27. The telecommunication device of clause 21, wherein each of the plurality of measurement sub-reports corresponds to a respective one of the plurality of PRS instances and includes a respective reference PRS identifier.

28. The telecommunication device of clause 21, wherein each of the plurality of measurement sub-reports corresponds to a respective one of the plurality of PRS instances and includes a respective error report.

29. The telecommunication device of clause 21, further comprising means for determining for which of the plurality of PRS instances to include respective ones of the plurality of PRS resource measurements in the batch measurement report based on an instance reporting request received from the network entity.

30. A non-transitory, processor-readable storage medium comprising processor-readable instructions to cause a processor of a telecommunication device to:

receive a schedule of a plurality of scheduled PRS resources (positioning reference signal resources) corresponding to a plurality of PRS instances and corresponding to a time span, the plurality of scheduled PRS resources comprising a first plurality of PRS resources and a second plurality of PRS resources that is separate from the first plurality of PRS resources;

transmit, to a network entity, a batch measurement report corresponding to the time span and comprising a plurality of PRS resource measurements each corresponding to a respective PRS resource of the second plurality of PRS resources; and provide consistent reporting across a plurality of measurement sub-reports of the batch measurement report by ensuring that at least two of the plurality of PRS resource measurements correspond to a same PRS level and that each of the at least two of the plurality of PRS resource measurements corresponds to a respective different one of the plurality of PRS instances.

31. The storage medium of clause 30, wherein the same PRS level comprises a same PRS resource, or a same PRS resource set, or a same PRS source.

32. The storage medium of clause 30, wherein the processor-readable instructions to cause the processor to provide consistent reporting comprise processor-readable instructions to cause the processor to provide the consistent reporting based on a request received from the network entity.

33. The storage medium of clause 30, further comprising processor-readable instructions to cause the processor to select the at least two of the plurality of PRS resource measurements based on measurements of a subset of the plurality of scheduled PRS resources.

34. The storage medium of clause 30, wherein the first plurality of PRS resources corresponds to a first subset of the plurality of PRS instances and the second plurality of PRS resources corresponds to a second subset of the plurality of PRS instances, and wherein the storage medium comprises processor-readable instructions to cause the processor to ensure that the plurality of PRS resource measurements include at least one PRS resource measurement, corresponding to the same PRS level, for every one of the second subset of the plurality of PRS instances in the batch measurement report.

35. The storage medium of clause 30, wherein the plurality of measurement sub-reports comprises a first measurement sub-report and a second measurement sub-report each corresponding to a respective one of the plurality of PRS instances, and wherein the processor-readable instructions to cause the processor to provide consistent reporting comprise processor-readable instructions to cause the processor to determine which one or more of the plurality of PRS resource measurements to include in the first measurement sub-report regardless of which one or more of the plurality of PRS resource measurements are included in the second measurement sub-report.

36. The storage medium of clause 30, wherein each of the plurality of measurement sub-reports corresponds to a respective one of the plurality of PRS instances and includes a respective reference PRS identifier.

37. The storage medium of clause 30, wherein each of the plurality of measurement sub-reports corresponds to a respective one of the plurality of PRS instances and includes a respective error report.

38. The storage medium of clause 30, further comprising processor-readable instructions to cause the processor to determine for which of the plurality of PRS instances to include respective ones of the plurality of PRS resource measurements in the batch measurement report based on an instance reporting request received from the network entity.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, the term RS (reference signal) may refer to one or more reference signals and may apply, as appropriate, to any form of the term RS, e.g., PRS, SRS, CSI-RS, etc.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that communication using the wireless communication device is exclusively, or evenly primarily, wireless, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of $\pm 20\%$ or $\pm 10\%$, $\pm 5\%$, or $+0.1\%$ from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of $\pm 20\%$ or $\pm 10\%$, $\pm 5\%$, or $\pm 0.1\%$ from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A telecommunication device comprising:
   a transceiver;
   a memory; and
   a processor, communicatively coupled to the transceiver and the memory, configured to:
      establish a positioning session with a network entity; and
      transmit, via the transceiver to the network entity, a capability report indicating a measurement reporting capacity for a batch measurement report of measurements of a plurality of positioning reference signal (PRS) instances.

2. The telecommunication device of claim 1, wherein the measurement reporting capacity comprises a quantity of measurement sub-reports each corresponding to a respective one of the plurality of PRS instances.

3. The telecommunication device of claim 1, wherein the measurement reporting capacity comprises a quantity of measurement elements each corresponding to a respective one of the plurality of PRS instances and to a PRS source.

4. The telecommunication device of claim 1, wherein the capability report indicates that the telecommunication device is capable of ensuring that the measurements of the plurality of PRS instances include PRS resource measurements of consistent PRS level.

5. The telecommunication device of claim 1, wherein the capability report indicates the measurement reporting capacity as a function of a frequency of PRS resources of the plurality of PRS instances.

6. The telecommunication device of claim 1, wherein the capability report indicates a processing priority of the plurality of PRS instances.

7. A method of reporting positioning measurement reporting capability, the method comprising:

establishing a positioning session between a telecommunication device and a network entity; and transmitting, from the telecommunication device to the network entity, a capability report indicating a measurement reporting capacity for a batch measurement report of measurements of a plurality of positioning reference signal (PRS) instances.

8. The method of claim 7, wherein the measurement reporting capacity comprises a quantity of measurement sub-reports each corresponding to a respective one of the plurality of PRS instances.

9. The method of claim 7, wherein the measurement reporting capacity comprises a quantity of measurement elements each corresponding to a respective one of the plurality of PRS instances and to a PRS source.

10. The method of claim 7, wherein the capability report indicates that the telecommunication device is capable of ensuring that the measurements of the plurality of PRS instances include PRS resource measurements of consistent PRS level.

11. The method of claim 7, wherein the capability report indicates the measurement reporting capacity as a function of a frequency of PRS resources of the plurality of PRS instances.

12. The method of claim 7, wherein the capability report indicates a processing priority of the plurality of PRS instances.

13. A telecommunication device comprising:

means for establishing a positioning session with a network entity; and means for transmitting, to the network entity, a capability report indicating a measurement reporting capacity for a batch measurement report of measurements of a plurality of PRS positioning reference signal (PRS) instances.

14. The telecommunication device of claim 13, wherein the measurement reporting capacity comprises a quantity of measurement sub-reports each corresponding to a respective one of the plurality of PRS instances.

15. The telecommunication device of claim 13, wherein the measurement reporting capacity comprises a quantity of measurement elements each corresponding to a respective one of the plurality of PRS instances and to a PRS source.

16. The telecommunication device of claim 13, wherein the capability report indicates that the telecommunication device is capable of ensuring that the measurements of the plurality of PRS instances include PRS resource measurements of consistent PRS level.

17. The telecommunication device of claim 13, wherein the capability report indicates the measurement reporting capacity as a function of a frequency of PRS resources of the plurality of PRS instances.

18. The telecommunication device of claim 13, wherein the capability report indicates a processing priority of the plurality of PRS instances.

19. A non-transitory, processor-readable storage medium comprising processor-readable instructions to cause a processor of a telecommunication device to:

establish a positioning session with a network entity; and transmit, to the network entity, a capability report indicating a measurement reporting capacity for a batch measurement report of measurements of a plurality of positioning reference signal (PRS) instances.

20. The storage medium of claim 19, wherein the measurement reporting capacity comprises a quantity of measurement sub-reports each corresponding to a respective one of the plurality of PRS instances.

21. The storage medium of claim 19, wherein the measurement reporting capacity comprises a quantity of measurement elements each corresponding to a respective one of the plurality of PRS instances and to a PRS source.

22. The storage medium of claim 19, wherein the capability report indicates that the telecommunication device is capable of ensuring that the measurements of the plurality of PRS instances include PRS resource measurements of consistent PRS level.

23. The storage medium of claim 19, wherein the capability report indicates the measurement reporting capacity as a function of a frequency of PRS resources of the plurality of PRS instances.

24. The storage medium of claim 19, wherein the capability report indicates a processing priority of the plurality of PRS instances.

25. A server comprising:

a transceiver;

a memory; and a processor, communicatively coupled to the transceiver and the memory, configured to:

receive, from a telecommunication device via the transceiver, a batch measurement report indicative of a plurality of positioning reference signal (PRS) resource measurements of first PRS resources from a plurality of scheduled PRS resources comprising the first PRS resources and comprising second PRS resources and arranged in a plurality of PRS instances; and transmit, to the telecommunication device via the transceiver, a report request that:

is indicative of which one or more of the plurality of PRS instances for the telecommunication device to measure; or requests the telecommunication device to provide consistent reporting across sub-reports of the batch measurement report by ensuring that at least two of the plurality of PRS resource measurements correspond to a same PRS level and that each of the at least two of the plurality of PRS resource measurements corresponds to a respective different one of the plurality of PRS instances; or provides a reporting consistency parameter for consistent reporting provided by the telecommunication device to meet; or any combination thereof.

26. The server of claim 25, wherein the report request indicates a particular instance of the plurality of PRS instances for the telecommunication device to measure.

27. The server of claim 25, wherein the report request indicates a window of time corresponding to a subset of the plurality of PRS instances for the telecommunication device to measure.

28. The server of claim 25, wherein the report request provides the reporting consistency parameter, and wherein the reporting consistency parameter comprises an indication of a PRS source, an indication of a PRS resource set, or an indication of a particular PRS resource of the plurality of scheduled PRS resources, or any combination thereof.

29. The server of claim 25, wherein the report request provides the reporting consistency parameter, and wherein the reporting consistency parameter comprises a first quantity of PRS items for which to provide consistent reporting, or a second quantity of the plurality of PRS instances from which to use PRS reference measurements to determine a particular PRS item for which to provide consistent reporting, or a combination thereof.

30. A method for affecting positioning reference signal reporting, the method comprising:

receiving, at a server from a telecommunication device, a batch measurement report indicative of a plurality of positioning reference signal (PRS) resource measurements of first PRS resources from a plurality of scheduled PRS resources comprising the first PRS resources and comprising second PRS resources and arranged in a plurality of PRS instances; and transmitting, from the server to the telecommunication device, a report request that:

is indicative of which one or more of the plurality of PRS instances for the telecommunication device to measure; or requests the telecommunication device to provide consistent reporting across sub-reports of the batch measurement report by ensuring that at least two of the plurality of PRS resource measurements correspond to a same PRS level and that each of the at least two of the plurality of PRS resource measurements corresponds to a respective different one of the plurality of PRS instances; or provides a reporting consistency parameter for consistent reporting provided by the telecommunication device to meet; or any combination thereof.

31. The method of claim 30, wherein the report request indicates a particular instance of the plurality of PRS instances for the telecommunication device to measure.

32. The method of claim 30, wherein the report request indicates a window of time corresponding to a subset of the plurality of PRS instances for the telecommunication device to measure.

33. The method of claim 30, wherein the report request provides the reporting consistency parameter, and wherein the reporting consistency parameter comprises an indication of a PRS source, an indication of a PRS resource set, or an indication of a particular PRS resource of the plurality of scheduled PRS resources, or any combination thereof.

34. The method of claim 30, wherein the report request provides the reporting consistency parameter, and wherein the reporting consistency parameter comprises a first quantity of PRS items for which to provide consistent reporting, or a second quantity of the plurality of PRS instances from which to use PRS reference measurements to determine a particular PRS item for which to provide consistent reporting, or a combination thereof.

35. A server comprising:

means for receiving, from a telecommunication device, a batch measurement report indicative of a plurality of positioning reference signal (PRS) resource measurements of first PRS resources from a plurality of scheduled PRS resources comprising the first PRS resources and comprising second PRS resources and arranged in a plurality of PRS instances; and means for transmitting, to the telecommunication device, a report request that:

is indicative of which one or more of the plurality of PRS instances for the telecommunication device to measure; or requests the telecommunication device to provide consistent reporting across sub-reports of the batch measurement report by ensuring that at least two of the plurality of PRS resource measurements correspond to a same PRS level and that each of the at least two of the plurality of PRS resource measurements corresponds to a respective different one of the plurality of PRS instances; or provides a reporting consistency parameter for consistent reporting provided by the telecommunication device to meet; or any combination thereof.

36. The server of claim 35, wherein the report request indicates a particular instance of the plurality of PRS instances for the telecommunication device to measure.

37. The server of claim 35, wherein the report request indicates a window of time corresponding to a subset of the plurality of PRS instances for the telecommunication device to measure.

38. The server of claim 35, wherein the report request provides the reporting consistency parameter, and wherein the reporting consistency parameter comprises an indication of a PRS source, an indication of a PRS resource set, or an indication of a particular PRS resource of the plurality of scheduled PRS resources, or any combination thereof.

39. The server of claim 35, wherein the report request provides the reporting consistency parameter, and wherein the reporting consistency parameter comprises a first quantity of PRS items for which to provide consistent reporting, or a second quantity of the plurality of PRS instances from which to use PRS reference measurements to determine a particular PRS item for which to provide consistent reporting, or a combination thereof.

40. A non-transitory, processor-readable storage medium comprising processor-readable instructions to cause a processor of a server to:

receive, from a telecommunication device, a batch measurement report indicative of a plurality of positioning reference signal (PRS) resource measurements of first PRS resources from a plurality of scheduled PRS resources comprising the first PRS resources and comprising second PRS resources and arranged in a plurality of PRS instances; and transmit, to the telecommunication device, a report request that:

is indicative of which one or more of the plurality of PRS instances for the telecommunication device to measure; or requests the telecommunication device to provide consistent reporting across sub-reports of the batch measurement report by ensuring that at least two of the plurality of PRS resource measurements correspond to a same PRS level and that each of the at least two of the plurality of PRS resource measurements corresponds to a respective different one of the plurality of PRS instances; or provides a reporting consistency parameter for consistent reporting provided by the telecommunication device to meet; or any combination thereof.

41. The storage medium of claim 40, wherein the report request indicates a particular instance of the plurality of PRS instances for the telecommunication device to measure.

42. The storage medium of claim 40, wherein the report request indicates a window of time corresponding to a subset of the plurality of PRS instances for the telecommunication device to measure.

43. The storage medium of claim 40, wherein the report request provides the reporting consistency parameter, and wherein the reporting consistency parameter comprises an indication of a PRS source, an indication of a PRS resource set, or an indication of a particular PRS resource of the plurality of scheduled PRS resources, or any combination thereof.

44. The storage medium of claim 40, wherein the report request provides the reporting consistency parameter, and wherein the reporting consistency parameter comprises a first quantity of PRS items for which to provide consistent reporting, or a second quantity of the plurality of PRS instances from which to use PRS reference measurements to determine a particular PRS item for which to provide consistent reporting, or a combination thereof.

* * * * *